US 007826421B2

(12) United States Patent
Pousti et al.

(10) Patent No.: US 7,826,421 B2
(45) Date of Patent: Nov. 2, 2010

(54) APPLICATION POD INTEGRATION WITH AUTOMATED MOBILE PHONE BILLING AND DISTRIBUTION PLATFORM

(75) Inventors: Michael Pousti, San Diego, CA (US); Andrew Ballester, San Diego, CA (US)

(73) Assignee: SMS.ac, Inc., San Diego, CA (US)

( * ) Notice: Subject to any disclaimer, the term of this patent is extended or adjusted under 35 U.S.C. 154(b) by 640 days.

(21) Appl. No.: 11/688,584

(22) Filed: Mar. 20, 2007

(65) Prior Publication Data

US 2008/0040733 A1    Feb. 14, 2008

Related U.S. Application Data

(63) Continuation-in-part of application No. 11/516,921, filed on Sep. 6, 2006.

(60) Provisional application No. 60/784,536, filed on Mar. 20, 2006.

(51) Int. Cl.
G06F 9/46 (2006.01)

(52) U.S. Cl. .......... 370/329; 455/406; 455/414.1; 719/328

(58) Field of Classification Search ......... 455/406–408, 455/414.1; 379/114.01–132; 705/39–40, 705/50–59; 725/1–8; 719/328
See application file for complete search history.

(56) References Cited

U.S. PATENT DOCUMENTS

| | | | | |
|---|---|---|---|---|
| 5,566,291 | A * | 10/1996 | Boulton et al. | 715/709 |
| 7,283,981 | B2 * | 10/2007 | Solem | 705/42 |
| 2001/0054003 | A1 * | 12/2001 | Chien et al. | 705/14 |
| 2002/0107795 | A1 * | 8/2002 | Minear et al. | 705/40 |
| 2002/0107807 | A1 * | 8/2002 | Ketonen et al. | 705/51 |
| 2002/0194126 | A1 * | 12/2002 | Randell et al. | 705/40 |
| 2004/0006539 | A1 * | 1/2004 | Royer et al. | 705/40 |
| 2004/0043753 | A1 * | 3/2004 | Wake et al. | 455/406 |
| 2004/0123154 | A1 * | 6/2004 | Lippman et al. | 713/201 |
| 2004/0181591 | A1 * | 9/2004 | Yu et al. | 709/217 |
| 2005/0086309 | A1 | 4/2005 | Galli et al. | |
| 2005/0289047 | A1 * | 12/2005 | Oliver et al. | 705/39 |
| 2006/0026105 | A1 * | 2/2006 | Endoh | 705/59 |
| 2006/0200420 | A1 * | 9/2006 | Osada | 705/59 |
| 2006/0234698 | A1 | 10/2006 | Fok et al. | |
| 2006/0259427 | A1 * | 11/2006 | Randell et al. | 705/40 |
| 2006/0276171 | A1 | 12/2006 | Pousti | |
| 2007/0088837 | A1 * | 4/2007 | Gidron et al. | 709/228 |
| 2007/0208751 | A1 * | 9/2007 | Cowan et al. | 707/10 |

(Continued)

OTHER PUBLICATIONS

International Search Report for PCT/US2008/057708 mailed Jun. 23, 2008.

*Primary Examiner*—Kent Chang
*Assistant Examiner*—Kashif Siddiqui
(74) *Attorney, Agent, or Firm*—Procopio Cory Hargreaves & Savitch LLP; Noel C. Gillespie

(57) ABSTRACT

A platform for supporting a network-enabled application is configured to render the network enabled application for a user, via a user interface associated with the user, in accordance with various APIs included in the platform and used by a program developer to develop the network-enabled application. The rendering can included recognizing that the user interface is a mobile user interface and rendering the network-enabled application in a manner appropriate and/or optimal for the mobile user interface.

25 Claims, 19 Drawing Sheets

U.S. PATENT DOCUMENTS

2007/0244811 A1* 10/2007 Tumminaro ................... 705/39
2007/0255620 A1* 11/2007 Tumminaro et al. ........... 705/14
2007/0255652 A1* 11/2007 Tumminaro et al. ........... 705/39
2007/0265972 A1* 11/2007 Tsutsui ........................ 705/52
2007/0288370 A1* 12/2007 Konja .......................... 705/41
2008/0189683 A1* 8/2008 Payette et al. ................ 717/114

* cited by examiner

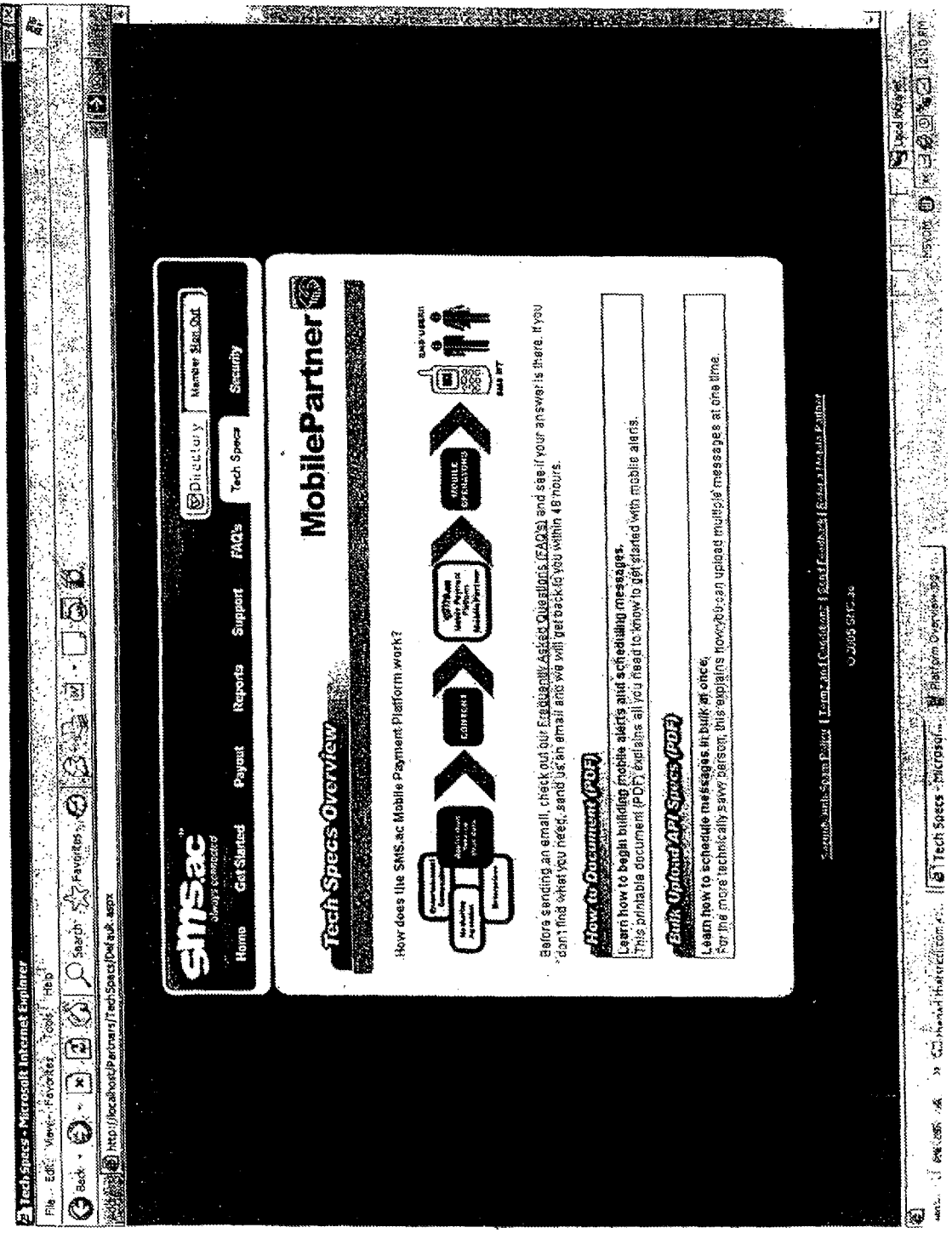

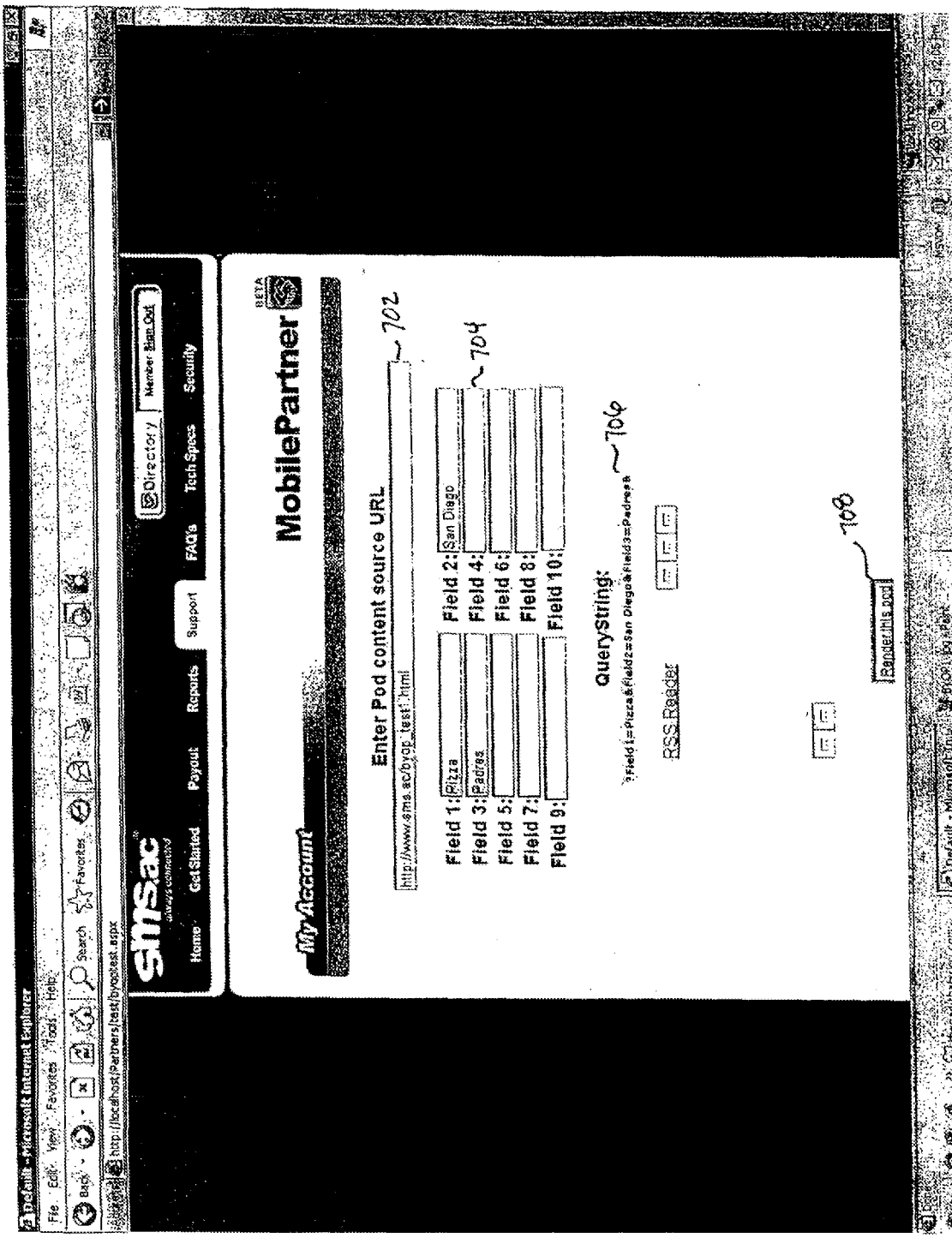

FIG. 8B

| Summary of Service | |
|---|---|
| | Mobile Facts |
| Company | BlackEvil |
| Type | Mobile Alert |
| Max Messages Daily | 4 |
| Pricing | $0.25 |
| Rating | No ratings |
| Location | World Wide |
| Language | United States |
| Users | 2 |
| Created | 8/11/2005 |
| Your mobile phone will be charged. | |

APPLICATION POD INTEGRATION WITH AUTOMATED MOBILE PHONE BILLING AND DISTRIBUTION PLATFORM

RELATED APPLICATION INFORMATION

This Application claims the benefit under 35 U.S.C. 119(e) to U.S. Provisional Patent Application Ser. No. 60/784,536, filed Mar. 20, 2006, entitled "Application Pod Integration With Automated Mobile Phone Billing and Distribution Platform." This Application claims the benefit as a Continuation-In-Part under 35 U.S.C. §120 to U.S. patent application Ser. No. 11/516,921, filed Sep. 6, 2006, entitled "Automated Billing and Distribution Platform for Application Providers." Both of the above application are incorporated herein for all purposes.

This Application is also related to commonly-owned U.S. patent application Ser. No. 11/446,973, filed Jun. 6, 2006, entitled "Billing Systems and Methods For Micro-Transactions," which is incorporated by reference herein for all purposes.

BACKGROUND INFORMATION

1. Field

The present invention relates to a dynamic community-based system which integrates application pods with an automated distribution and billing platform in an environment which supports micro-transactions for mobile phone users.

2. Background

While credit card use and automatic credit card billing is a common way to conduct business transactions in many countries, they are not necessarily the best way in some situations. In particular, there are many users of the internet that do not have access to a credit card. However, these users most likely have cellular telephone service. Also, use of a credit card is economically viable only if the transaction amount exceeds a particular amount that depends on the underlying efficiency of the billing and collecting system.

Currently, cellular telephone carriers (or mobile phone carriers, the terms are used interchangeably throughout this specification) routinely bill users for small transactional amounts and are able to do so while making a profit. These transactions are referred to as micro-transactions and, in terms of U.S. currency, can be as small as a few pennies (additionally, larger transactions occur as well). Retailers or vendors may desire to provide their respective content or services to mobile phone users via the web or directly through the user's mobile phone, and bill for such content or services as micro-transactions. Currently, a retailer or vendor will find it very difficult to take advantage of this opportunity for micro-transaction billing for their content or services accessed by a mobile phone user because doing so would require the retailer/vendor to personally negotiate and reach a contractual agreement with the particular cellular carrier to which the mobile phone user is subscribed. The process is further complicated by the fact that not all consumers use the same cellular carrier and, therefore, the retailer/vendor would need to contract with hundreds of different cellular carriers around the globe to be able to have this billing option available to the desired global market of mobile phone users.

Thus, there exists a need for a system and method that allows retailers to easily conduct transactions, many of which may be micro-transactions, with the global market of mobile phone users, where the transactions are easily billable to a wide variety of cellular carriers while eliminating the need for each retailer/vendor to individually contract with each of the wide variety of cellular carriers. In addition, it is desirable to provide a support system for retailers to develop application pods that are a dynamic and community-based for access and use by mobile phone users.

SUMMARY

One aspect of the present invention relates to a method and platform whereby software application providers can easily and automatically connect to a platform in order to offer access and use of their applications to a global community of mobile phone users through a variety of different mediums, while automatically charging the user via the user's billing account with the cellular carrier to which the user subscribes. According to this aspect of the invention, it is unnecessary for the software application provider to have contractual agreements with any of the cellular carriers. The platform requires the software application providers to use a standardized pricing structure in order to provide a consistent experience for users of the software applications that are accessed through the platform. One advantage of such a platform is that it provides software application providers a simple and automatic way to register and present their software applications for the global community. Registration, and therefore the availability, of the software applications can be accomplished in an automatic fashion that eliminates the need for a lengthy registration processing involving multiple layers of people and procedures.

In accordance with another aspect of the present invention, the platform of providing access to the software applications provides an automatic cut-off feature which permits all users of a particular software application to disable the ability of that software application to continue to be accessed through the platform or to charge the users through the users' respective billing accounts with their cellular carriers. In this manner, the community of users have automatic control through the platform to disable a disreputable or improper software application.

In accordance with another aspect of the present invention, the platform of providing access to the software applications includes specifying a standardized pricing structure for each software application that defines the terms and conditions under which the software application will generate a billable event for the user who accesses or uses the software application. Upon generation of a billable event by each software application, the platform automatically evaluates the billable event according to the specified terms and conditions of the corresponding pricing structure, and will discard the billable event if it is in violation of the terms and conditions. In this manner, the platform provides automatic regulation to prevent improper activity or billing by a software application that is accessed through the platform.

In another aspect of the invention, the aforementioned platform provides support tools, functions and services to allow developers to easily develop application pods that are dynamic and community-based for access and use by mobile phone users to provide information, content and/or services to mobile phone users and billed on a micro-transaction level through the platform.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIGS. 5-8 are screenshots illustrating example windows that software developers may be presented to assist in registering a new pod with the mobile community architecture of FIG. 2;

DETAILED DESCRIPTION

Figure 2:
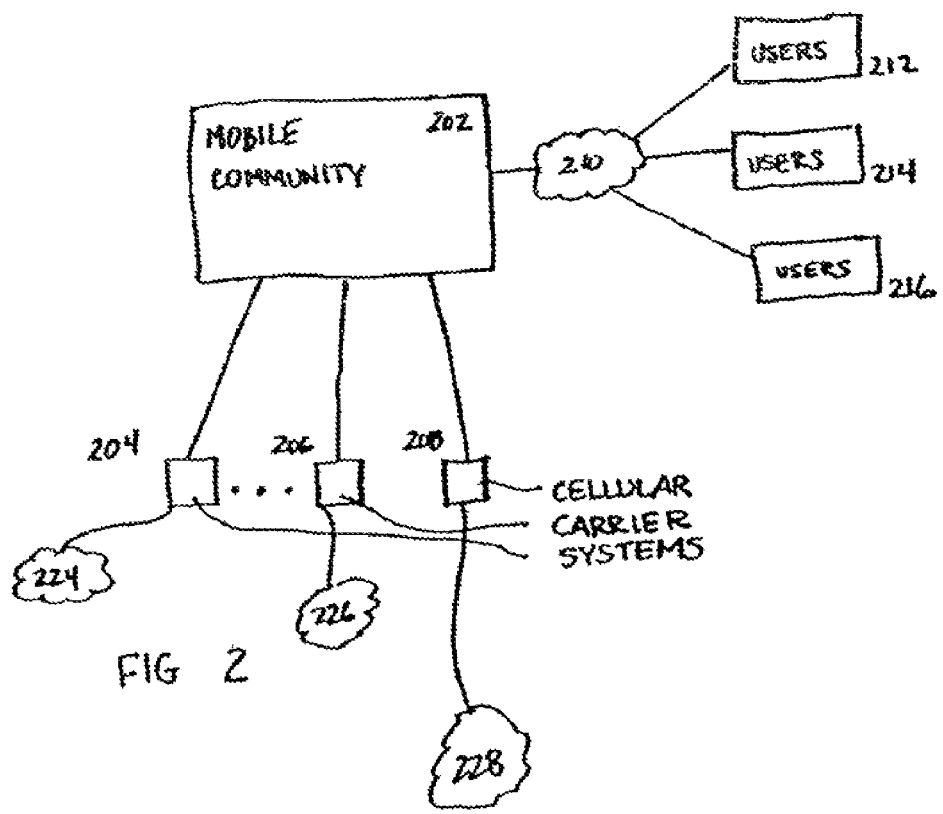
FIG. 2 is a block diagram that illustrated a computer-based mobile community in accordance with one embodiment.

FIG. 2 depicts a block diagram of a computer-based mobile community 202. Users 212, 214, 216 can connect to the mobile community 202 via a network or similar communications channel 210. Via the connection, a user (e.g., 212) may create a profile page or "home page" that they can personalize. This profile page can include various files and content that the user wants to share with other members of the mobile community 202.

The profile page may include a hierarchy of pages, some of which are for public view and some of which have restrictions on viewing. For example, the mobile community 202 can be logically organized into neighborhoods such as "friends", "family", "workplace", "dog owners", etc. Users 212, 214, 216 can belong to these different neighborhoods and share different pages with the members of the different neighborhoods.

Additionally, this mobile community 202 connects with various cellular carrier systems 204, 206, 208, each of which has an associated community of mobile phone subscribers, 224, 226 and 228. Users 212, 214, 216 of the mobile community 202 are also subscribers of various cellular carriers. In this way, users 212, 214, 216 of the mobile community 202 not only have access through the computer-based platform 202 to other users' profile pages, they also have easy access to subscribers of the various cellular carrier systems 204, 206, 208.

A benefit of the architecture depicted in FIG. 2, is that the mobile community platform 202 has already contracted for services with the cellular carrier systems 204, 206, 208. As is known in the art, the cellular carrier systems 204, 206, 208 provide messaging and premium message functionality. Such messages are sent via the cellular carrier's infrastructure to mobile subscribers and, internal to the cellular carrier's infrastructure, generates a billing event according to a particular tariff rate. In practice, when the mobile community 202 sends a message via a cellular carrier system (e.g., 204), it is billing the recipient of the message using the existing billing system of that cellular carrier. The billing event is often a microtransaction. Thus, a user (e.g., 212) of the mobile community may conduct transactions with a vendor within the mobile community 202 and be billed for those transactions via their cellular service account. The vendor in the transaction need only communicate with the mobile community 202 regarding the transaction and does not require any affiliation or agreement with any cellular carrier.

Figure 3:
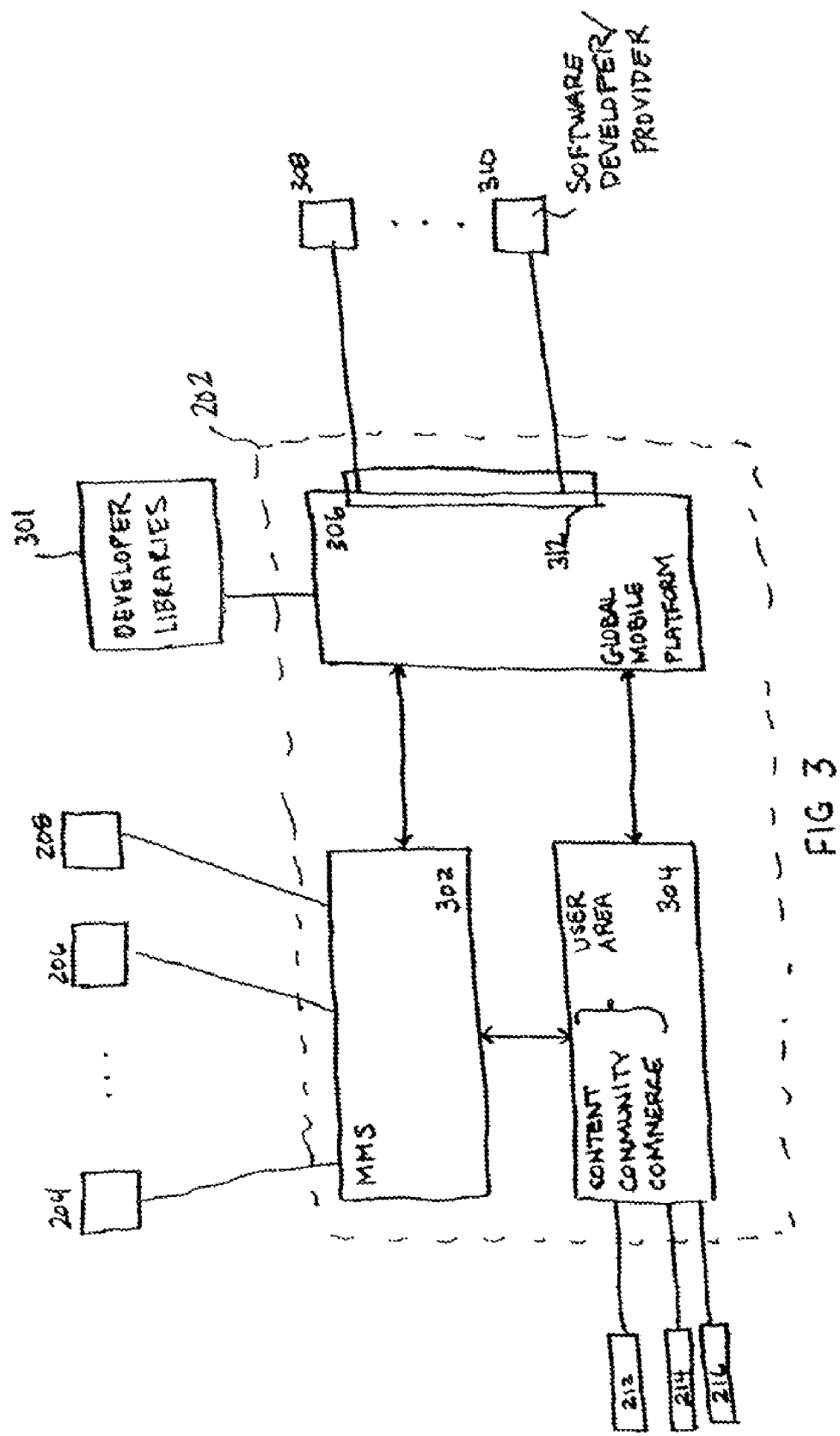
FIG. 3 is a block diagram that illustrates a more detailed view of the high-level system view of FIG. 2.

FIG. 3 depicts a more detailed view of the high-level system view of FIG. 2. In particular, the system of FIG. 3 can be used to conduct micro-transaction in which a cellular carrier's billing system is used by the mobile community 202 platform to automatically bill the user for each micro-transactions with a vendor/retailer, without the need for a negotiation or contract between the vendor and the cellular carrier. One example of this feature is that of software content distribution where software developers can offer software products to the users of the mobile community 202, while taking advantage of the billing arrangements already in place between the mobile community 202 and the cellular carriers 204, 206, 208. Of course, a software application may provide any other type of content or service to users of mobile community 202.

Some of the sub-components of the mobile community 202 are a global mobile platform 306, the user area 304 where the content, community and commerce functions are handled for the users, and a multimedia messaging system 302. The details of these different sub-components are more fully explained throughout the remainder of this detailed description.

As noted earlier, users 212, 214, 216 can visit the user area 304 to participate in an on-line community that includes various content and commerce opportunities. This is typically accomplished via a user's web browser that may be hosted on a laptop or desktop computer, or, in the alternative, even on the user's mobile device such as a PDA or mobile phone. Thus, the user area 304 includes a web server that communicates with users 212, 214, 216 and includes a data store of user information and other content. With these resources, the mobile community 202 is able to present to a user 212 a profile page ("home page") that reflects content and information associated with, and desired by, that particular user. This content and information is not maintained on the local computer being used by the user 212 but, rather, is maintained and managed by the computer systems within the user area 304.

Although not explicitly depicted in FIG. 3, one of ordinary skill will recognize that there are numerous functionally equivalent techniques to create, manage, store and serve user information, user profiles, user content, software tools and other resources within the user area 304. Included in these techniques are methods to ensure security, data integrity, data availability and quality of service metrics.

The multimedia messaging system 302 includes applications for connecting with and communicating with the multiple different cellular carriers 204, 206, 208 that have been partnered with the platform of mobile community 202. The MMS 302 is configured to generate message requests in the appropriate format for each of the cellular carriers 204, 206, 208 including tariff information that determines the amount for which the recipient of the message will be charged. Upon receipt of the message request, the cellular carriers 204, 206, 208 will use the information in the request to generate an appropriate message to the intended recipient/subscriber of the cellular carrier and then bill the recipient/subscriber's cellular service account for the specified amount.

The MMS 302 communicates with the user area 304, such that users of the mobile community 202 can advantageously use the connectivity of the MMS 302 with the carriers in order to send messages to subscribers of any of the cellular carriers 204, 206, 208. The messages may be SMS messages, MMS messages, or other message formats that are subsequently developed. Some of these messages may have zero tariff and, therefore do not generate a bill (other than the underlying charges implemented by the cellular carrier) and others may have non-zero tariffs resulting in a billing event for the recipient.

The global mobile platform 306 provides a link between software developers/providers 308, 310 and the mobile community 202. In particular, using an interface 312 (described in more detail herein), a software provider 308, 310 may offer services and products to users 212, 214, 216. Advantageously for the software provider 308, 310, the global mobile platform 306 also provides automatic and instant connectivity to the MMS 302 and the cellular carriers 204, 206, 208. Accordingly, the software provider 308, 310 can interact with all users of the mobile community 202 whereby billable transactions with users 212, 214, 216 are automatically billed via the billing systems of the cellular carriers 204, 206, 208. Furthermore, and importantly, this capability is available to the software provider 308, 310 without requiring the software provider 308, 310 to negotiate or contract with any cellular carrier for billing arrangements, or to worry about how to communicate with a cellular carrier's systems and resources. The software provider seamlessly takes advantage of the unified set of connectivity and billing arrangements that exist between the mobile community 202 and the cellular carriers 204, 206, 208. Thus, in addition to the contractual arrangements and affiliations the mobile community 202 has in place with different carriers 204, 206, 208, the underlying technical and communications infrastructure is also in place to communicate with and interoperate with each of the different carriers 204, 206, 208. As a result, vendors and other members of the mobile community may interface with and operate with any of a variety of different carriers without difficulty.

While some software applications that are available to users 212, 214, 216 may be hosted in the user area 304, the global mobile platform 306, or elsewhere in the community 202, it is often the case that the software developer/provider 308, 310 will host their own software application at their own remote location. Accordingly, in the description that follows, even if remotely-hosted software is being discussed in a specific example, one of ordinary skill will readily appreciate that software application being hosted differently is also expressly contemplated.

Figure 4:
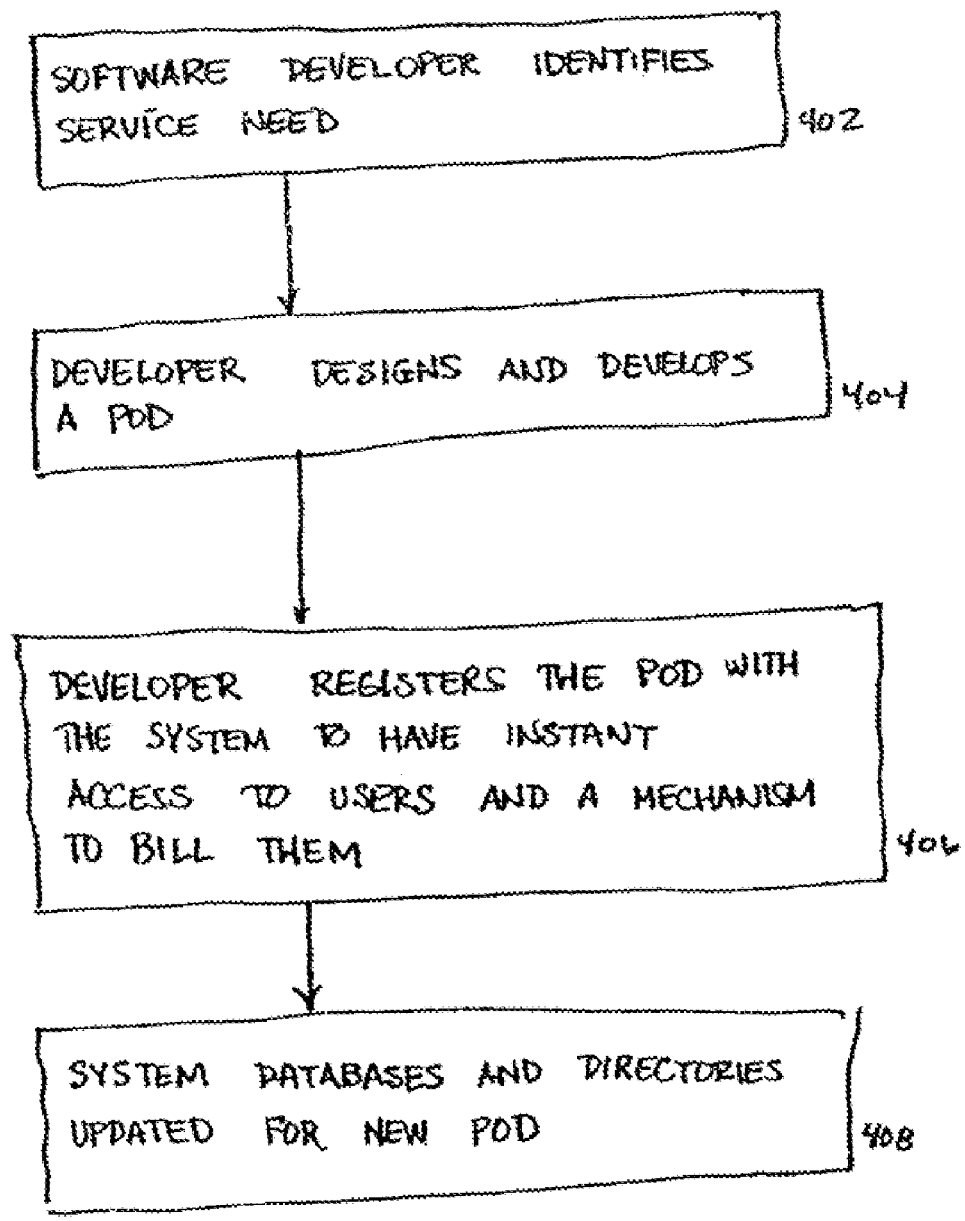
FIG. 4 is a flowchart illustrating an example method for distributing software via the mobile community architecture of FIG. 2.

FIG. 4 depicts a flowchart of an exemplary method for distributing software via the mobile community architecture of FIG. 2. In a first step 402, a software developer identifies a marketplace need that is not being fulfilled. In other words, the software developers believes that there is a service or product that they can provide that will be profitable. The variety of different types of services, content and products that can be offered to users via a software application is limited only by the imagination of the different software developers.

The term "pod service" or "pod application" is used in the following description as a label for software applications offered through the mobile community 202. This label is used merely for convenience and is not intend to limit or restrict the types, variety and capabilities of potential software applications in any way. As used herein, the term "pod" refers both to a the underlying information related to the pod application and to the graphical rendering of the pod application on a user's profile page within the mobile community 202.

Once the marketplace is identified, the developer commences development of their software application in step 404. The underlying application logic is up to the developer and can utilize any of the widely known programming environments and techniques available to one of ordinary skill in this area. However, the software application will be offered within the mobile community 202 along with a variety of other software applications. Accordingly, standardizing the look and feel of the application and information about the application will aid the users 212, 214, 216 and make their community experience more enjoyable.

Once a pod application has been developed (and most likely tested and verified) by a developer, the developer registers, in step 406, the pod application with the global mobile platform. Registering the pod application, which is described in more detail later with reference to a number of screenshots, allows the software developer to inform the global mobile platform 306 that a new pod application is available for the access by mobile community 202.

Once a pod application is registered, the global mobile platform 306 updates, in step 408, system databases and directories for the new pod application and its associated information. In the above description of FIG. 4, it is evident that the pod developer communicates with the mobile community 202 for a number of different reasons. One of ordinary skill will recognize that these various communications between the pod developer and the mobile community can occur via any of a variety of functionally equivalent means. For example, both wired and wireless communication methods for these communications are explicitly contemplated within the scope of the present invention.

Figure 5:
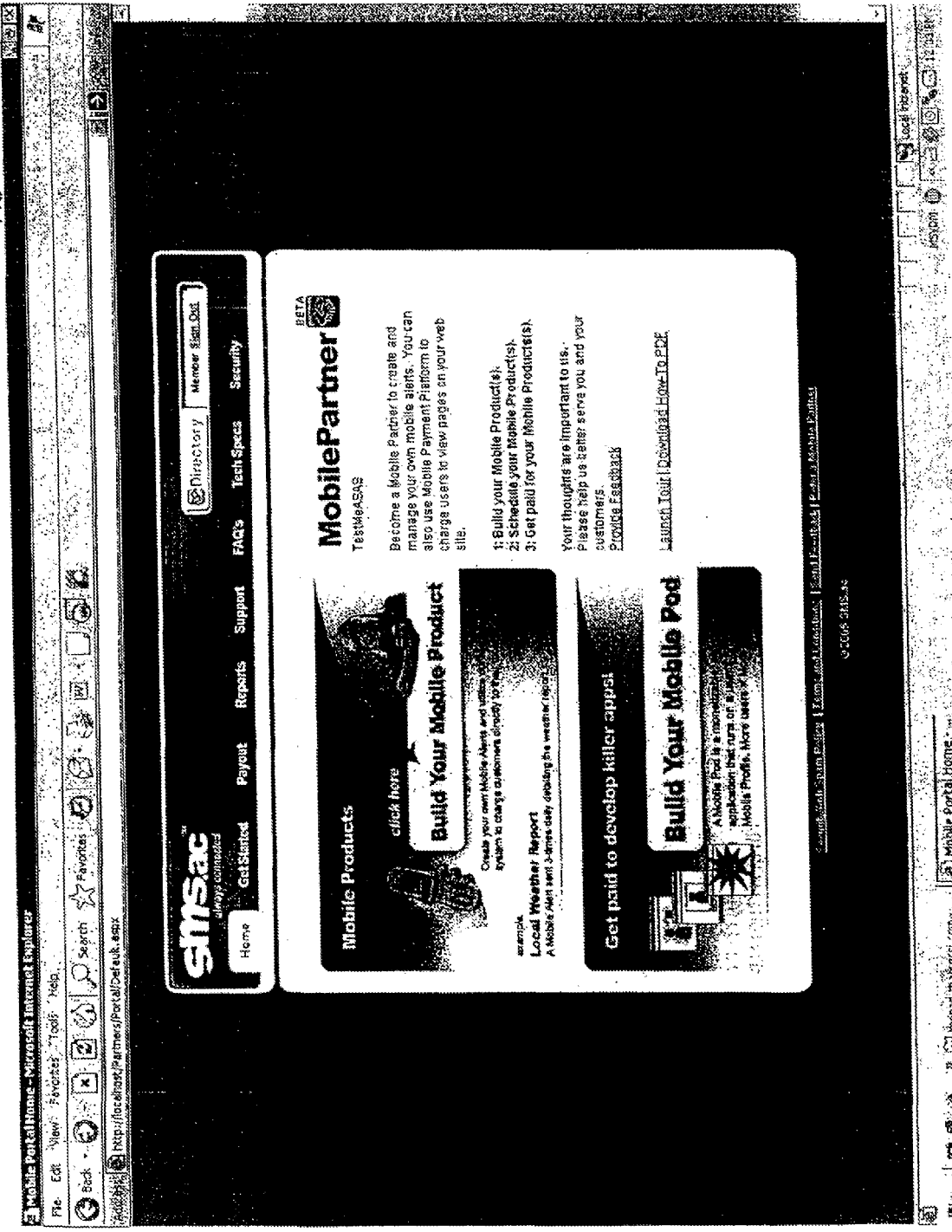

FIG. 5 is a screenshot of an exemplary window that software developers may be presented to assist in registering a new pod. From this screen, the software developer can navigate to a screen that provides more technical information such as the one shown in FIG. 6. This screen illustrates to the developer how the pod application takes advantage of the existing mobile payment platform when used by an end user.

FIG. 7 is a screenshot of an exemplary pod registration screen. Because the pod application is most likely hosted remotely, an input window 702 allows the pod developer to provide the URL of where the pod application is located. When a user ultimately uses the pod within the community 202, this URL is the location from where the content for the pod application is retrieved. For example, if the pod application was developed to display pictures for a dating service, this URL would point to code that when executed could detect user input events and result in the display of appropriate images.

The pod developer can utilize the field input boxes 704 to specify different fields that can capture input when a user first accesses a pod. For example, if a pod application is developed to provide stock quotes, then these fields could be defined to accept stock symbols. When the user views the pod within their profile page, these fields can be filled in with appropriate stock symbols, for example. When the user then selects a "submit" button, this information is sent to the pod application which returns the appropriate information.

As is well known to HTML and HTTP developers, based on the information that is filled in the field windows 704, a particular query string will be appended to a request received from a user's form submission. To aid a developer in registering a pod, this query string is automatically generated and displayed for the pod developer in region 706 of the exemplary screen. To give the pod developer a quick view of how the pod will be rendered, a button 708 is provided to illustrate the pod. With this information, the developer may choose to revise their design.

Figure 8A:
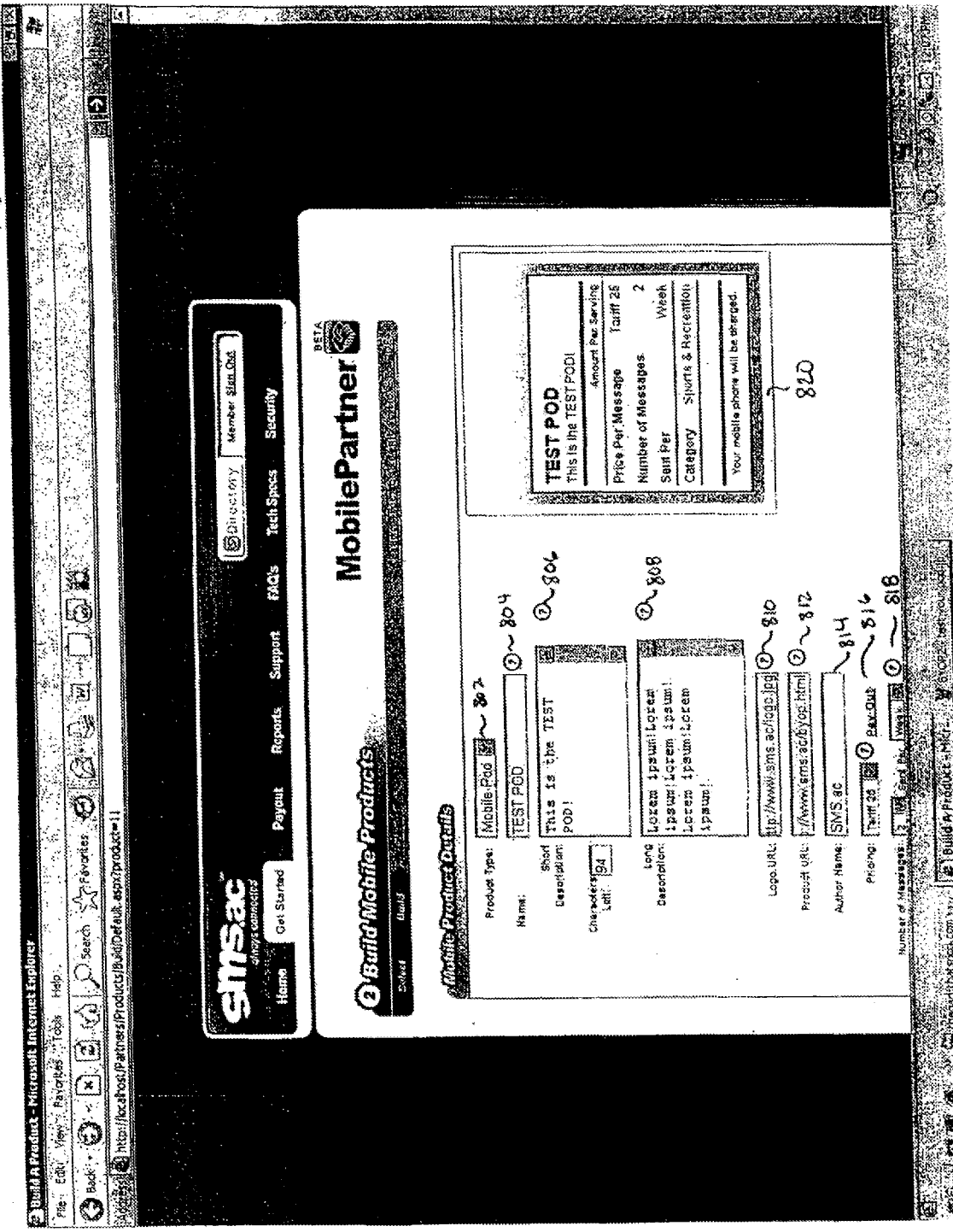
Figure 8B:
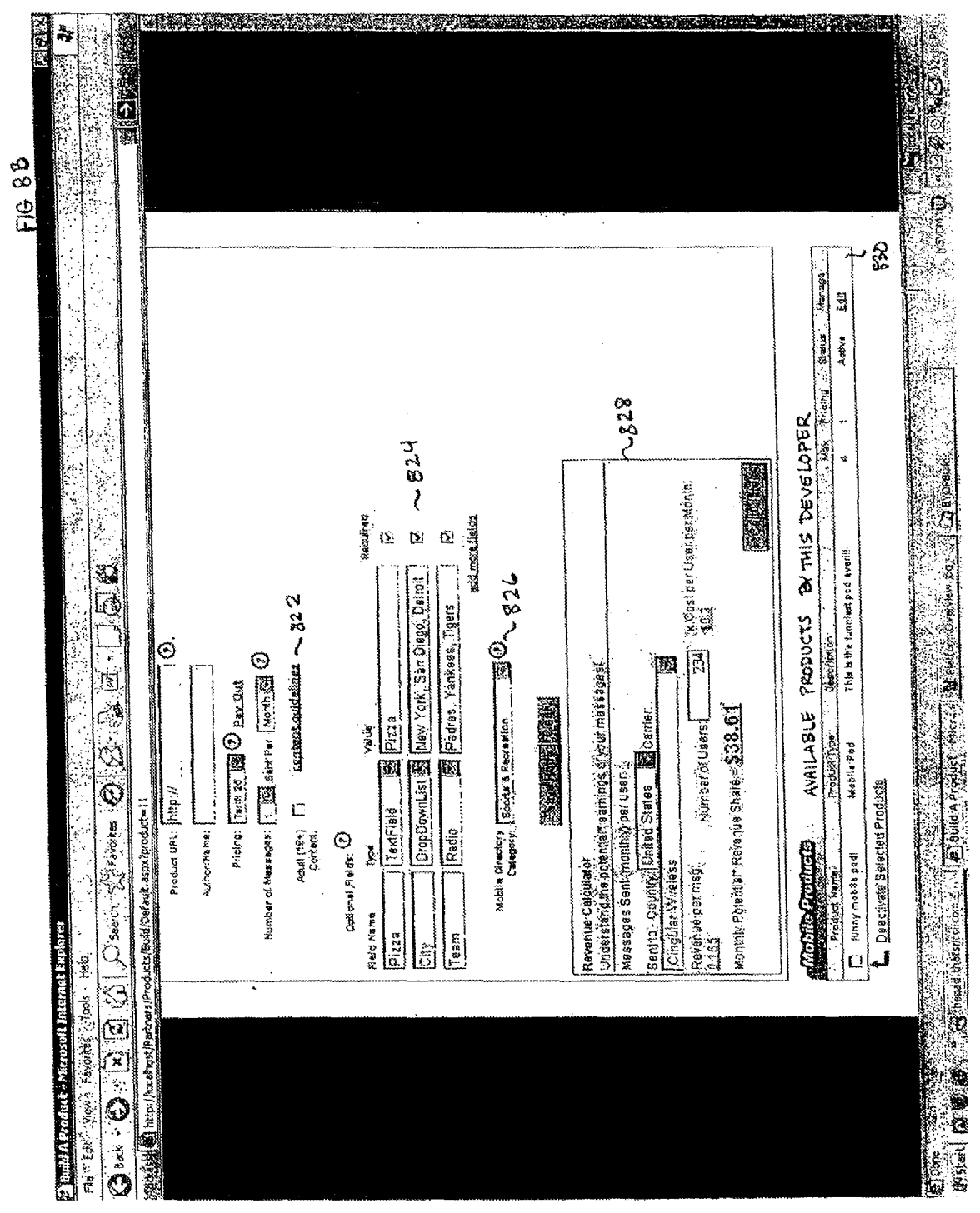

Once this initial information is collected, the global mobile platform 306 collects additional information that is associated with the pod. In FIGS. 8A and 8B, a number of input fields 802-830 are provided for the pod developer to fill in while registering their pod application. Many of these fields are self-explanatory; however, some warrant a more detailed discussion. In particular, a pricing window 816 is available for the developer to select an appropriate pricing scheme, according to a standardized pricing structure. According to one embodiment of the present invention, pricing occurs in fixed tariff bands. For example, one band would be a $0.25 band and would be used for products or services that the developer thinks users would purchase for around $0.25. Another band may be $1.00 and would be for higher priced items and still other bands can be used as well. According to this arrangement, not all prices are available to the developer; instead, the developer picks the closest band to use (e.g., the $1.00 band is selected even if market research shows users would actually pay $1.03 for the service).

Additionally, the pod application will likely be used by people in different countries. Because of the vagaries of global economics, $0.25 may be too high of a price-point in many countries. Thus, it is more appropriate to set a price-point for each separate country from which the pod application may be used. While it is possible for the global mobile platform 306 to permit the pod developer to set such a vast number of price-points, most developers will not have the knowledge or the patience to perform such a task. Accordingly, the global mobile platform 306, automatically provides a price band selection for each country based on their respective costs of living. In other words, a developer can select a price band in the currency that he is comfortable with and let the global mobile platform 306 translate that to an equivalent price band in each country.

Via the input field 818, the developer also specifies the number of messages and frequency that their pod application will send to each user. Based on their knowledge of having developed the pod application to perform a particular service, the pod developer may, for example, know that no more than 4 messages per day (per user) will be sent from their pod application. This information sets the terms and conditions for billing the user. Thus, they would fill in this field 818 accordingly. As explained later, the global mobile platform 306 can use this information to control message traffic within the community 202.

The benefit of specifying the pricing information and number of message information is that the terms and conditions of the pod application can be provided to a user in a uniform manner. Window 820 displays, for the pod developer, how the pod application information, including pricing, terms and conditions, will be shown to a user. FIG. 8C depicts a more detailed view of this uniform pricing display. Much, like nutritional labels on food products provide a uniform format for presenting the nutritional information, the format depicted in window 820 can be used to uniformly present information about pod applications. Thus, a user of the community does not have to learn and interpret different pricing information for each different pod developer. Instead, the uniform format 820 simplifies understanding this information. The exemplary format of window 820 includes a variety of information about the pod application. Of particular interest to most users is the uniform manner in which the pricing information 870 and the message information 872 is clearly presented. One of ordinary skill will appreciate that the format of window 820 is merely exemplary in nature and can vary in numerous ways without departing from the scope of the present invention. Accordingly, the exemplary format of window 820 is provided to illustrate that the global mobile platform 306 is arranged so as to provide users of the community 202 with uniformly formatted information from a variety of different pod applications so as to simplify the evaluation and comparison of different offerings. With such a uniform pricing arrangement being utilized, it becomes possible to monitor the behavior of pod developers with respect to their specified pricing structure and implement control measures such as limiting or restricting their activities within the mobile community if warranted.

Once the information of screens 8A and 8B are submitted to the global mobile platform 306, the pod application is registered with the mobile community 202. According to at least one embodiment of the present invention, the pod application is evaluated by a moderator of the mobile community 202 to ensure it is acceptable from a technical and content point of view for the community 202. In this scenario, the pod application is not registered until the evaluation is completed satisfactorily.

Information about a registered pod application is stored within the global mobile platform 306 in such a way that when a user wants to include a pod on their profile page, the pod can be rendered using the stored information and interaction between the pod and user will occur based on the stored information as well. In such a case, the data associated with the user will be updated to reflect that the user is now accessing and using the pod.

Thus, according to the previously described technique, a pod developer can automatically register a new pod application (even from a remote location) without difficulty in such a way that the pod automatically becomes available to users of the mobile community 202 at the conclusion of the registration process. Furthermore, from the pod developer's point of view, the pod application may immediately take advantage of the billing platform used by the mobile community 202 without the need to have existing contracts in place with one or more cellular carriers.

One benefit of registering pod applications in this manner is that once registered, the global mobile manager 306 can prevent the terms and condition information from being changed by the pod developer. Thus, a user's agreed upon price and operating parameters will not be modified (with or without their knowledge).

The users of the global community can locate available pod applications in a number of different ways. First, the community 202 facilitates sharing of information by people having common tastes. Accordingly, within the community users frequently visit other users profile pages looking for interesting content and information, particularly with neighborhoods to which the user belongs. During this visiting of other members' home pages, a user can discover an interesting pod and want to get it for themselves. In terms of the community, a user "owns" their own profile page and is called an "owner" when at their profile page. In contrast, when a user visits some else's profile page, they are considered a "viewer". Within the mobile community 202, the profile pages are maintained such that the view by an owner may not always correspond to that seen by a viewer as the owner may want some information to be private and other information to be public.

In another instance, a user may know a friend or colleague would want a particular pod application; thus, the community 202 allows a user to inform another user about the existence of a new pod application. Another way in which pod applications are located is via a directory within the mobile community 202. For example, the global mobile platform 306 registers each pod application as the developers submit them; it is a simple extension to include a database update and a searchable-directory update as part of the registration process (see step 408 of FIG. 4).

Figure 9:
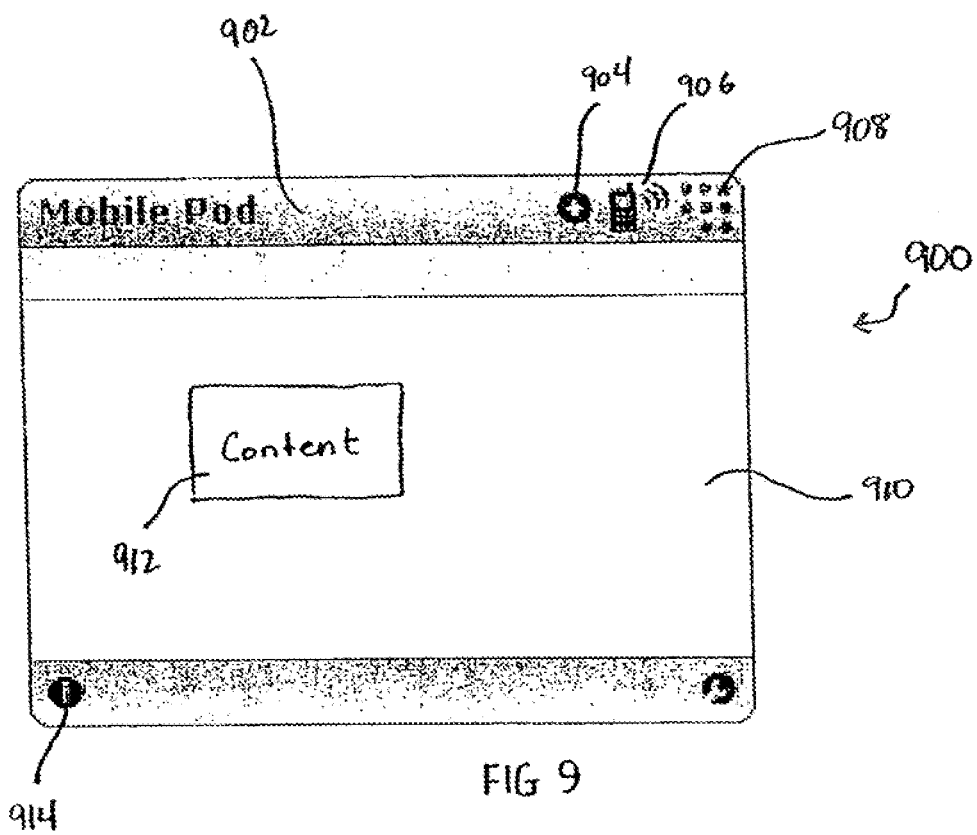
FIG. 9 is a diagram illustrating an example pod that can be developed and registered using the process depicted in screenshots 5-8.

A rendering of an exemplary pod 900 is depicted in FIG. 9. The pod includes a title bar 902 with a number of icons 904-908. The main window 910 of the pod is where the content 912 is displayed. This content is based on the associated pod application and the stored system information associated with this pod. From the pod 900, a user launches an initial message to the associated pod application. In instances where the pod application provides content back to the pod 900, the window 910 is updated. By using remote scripting capability, as is known in the art, the updating of window 910 can occur without the user manually refreshing the window 910. Similar to the profile pages described earlier, the pod 900 can be designed to provide different views of content 912 to a user depending on whether the user is an "owner" or a "viewer".

The icon 904 can be selected by a user (for example, when viewing someone else's pod) to add that pod to their own profile page. The icon 906 can be selected to inform another user about this pod and a drag icon 908 can be used to move the pod around a user interface screen. The "information" icon 914 is useful for displaying information about the pod, including the uniform pricing information described earlier.

Figure 10:
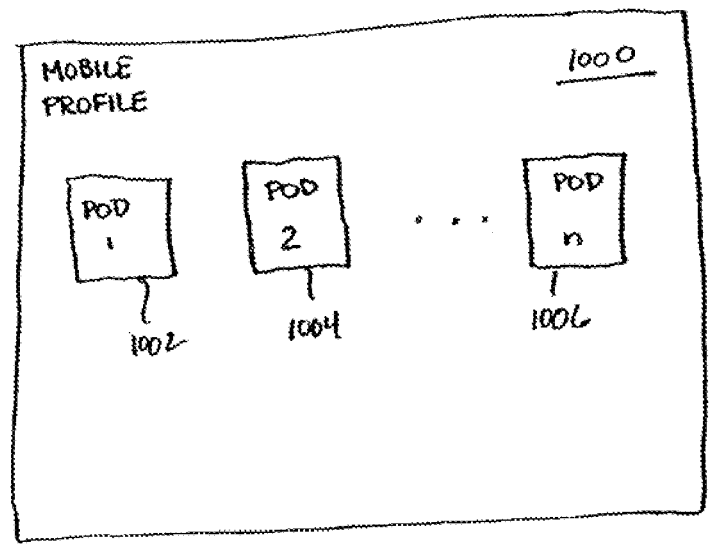
FIG. 10 is a diagram illustrating an example user profile page that can include pods, such as the pod of FIG. 9, and can be hosted by the mobile community architecture of FIG. 2.

FIG. 10 depicts a exemplary user profile page 1000 that has arranged thereon a plurality of pods 1002, 1004, 1006. In this manner, the pods available to a user can be displayed on their profile page. As noted earlier, the user can access this profile page via a number of different devices. For example, in addition to use of a traditional web browser, a portable device such as a smart phone or PDA can be used to access the profile page and pods. Such portable devices can utilize traditional WAP-based or HTML-based techniques to access the pods but they may also utilize device-based applications with proprietary protocols specifically developed to advantageously utilize the capabilities provided by pods and pod applications. Other example techniques implemented by portable devices that can be configured to access a profile page described herein include BREW, J2ME, etc.

Figure 11:
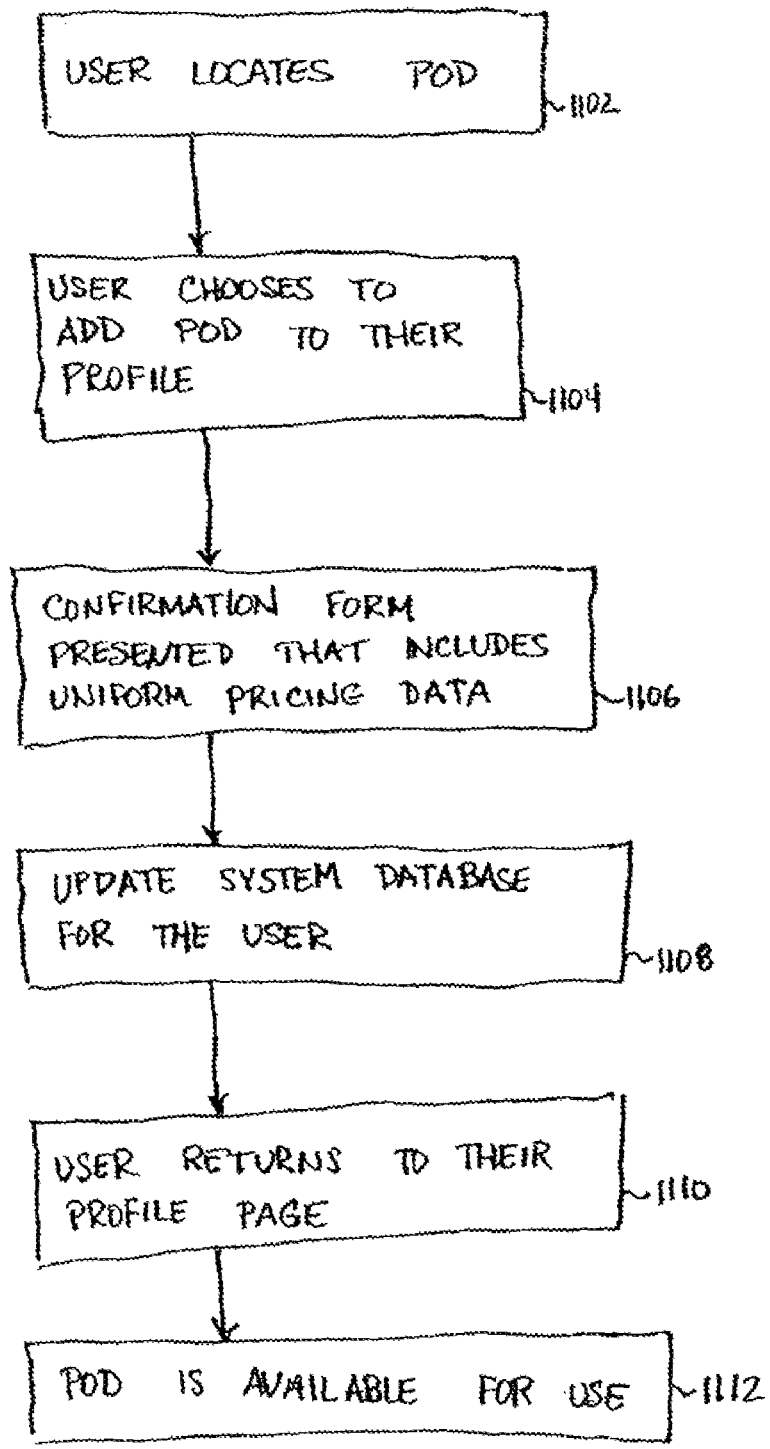
FIG. 11 is a flowchart illustrating an example method for a user to add a pod to their profile page.

FIG. 11 illustrates a flowchart of an exemplary method for a user to add a pod to their profile page. In step 1102, the pod user locates an interesting pod via a visit to another user's profile page or through a directory search. In evaluating the pod, the user can see the terms and conditions of the pod in the uniform presentation format described earlier. Next, in step 1104, the user chooses to add the pod to their profile page; typically using a standardized feature on the pod. In step 1106, a confirmation page is sent to the user to ensure they know the pricing information about the pod and to ensure they are aware of the likelihood of their cellular service account being billed as a result of executing the pod application. Assuming the user confirms their selection, the user area 304 updates, in step 1108, its data store about this user such that the records indicate the user owns this new pod on their profile page. When the user next visits their profile page, in step 1110, and as a result of the user area 304 rendering their profile page on their browser, the new pod will be displayed. With the pod displayed within the profile page, it is now available for use by the user, in step 1112.

Figure 12:
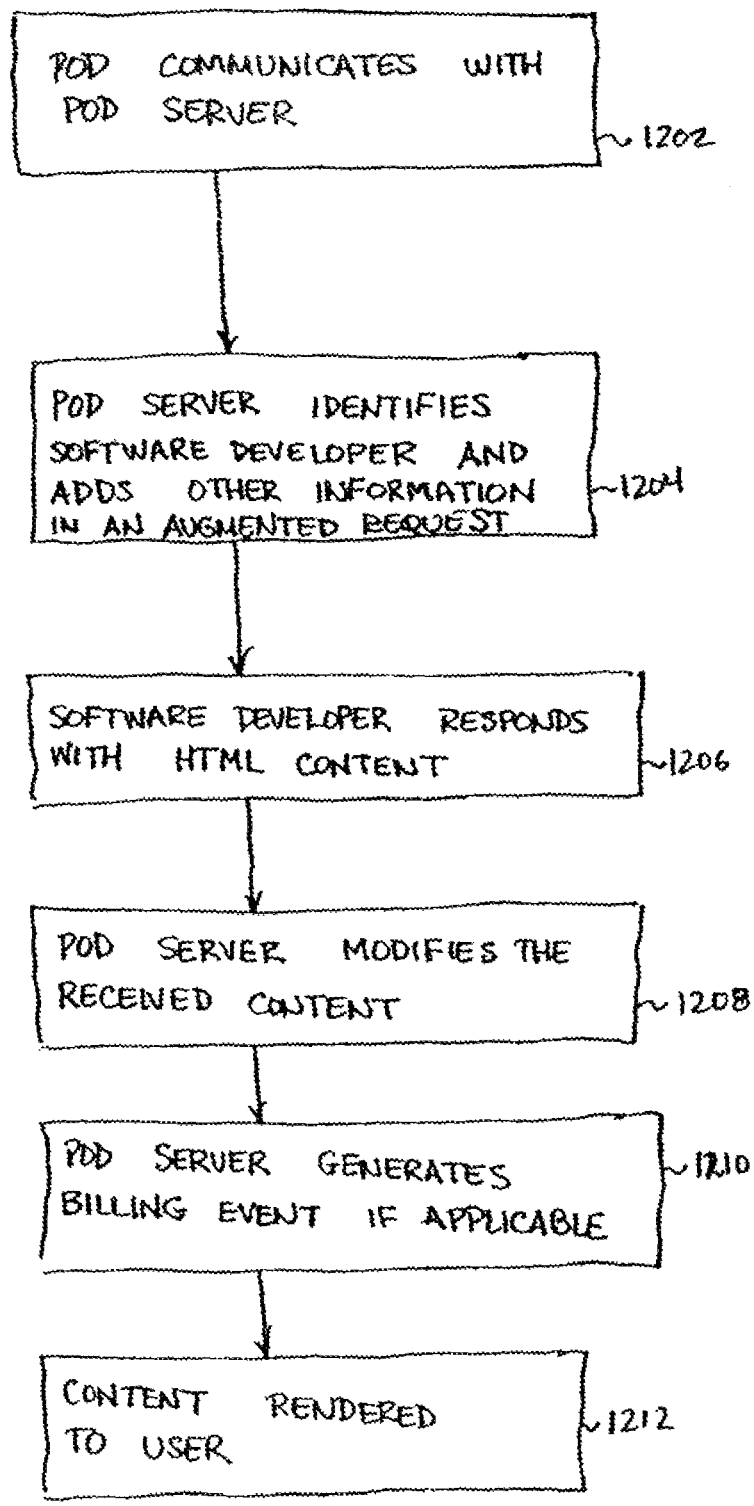
FIGS. 12 and 13 are flowcharts illustrating the operation of a pod and its associated pod application within the mobile community of FIG. 2.
Figure 13:
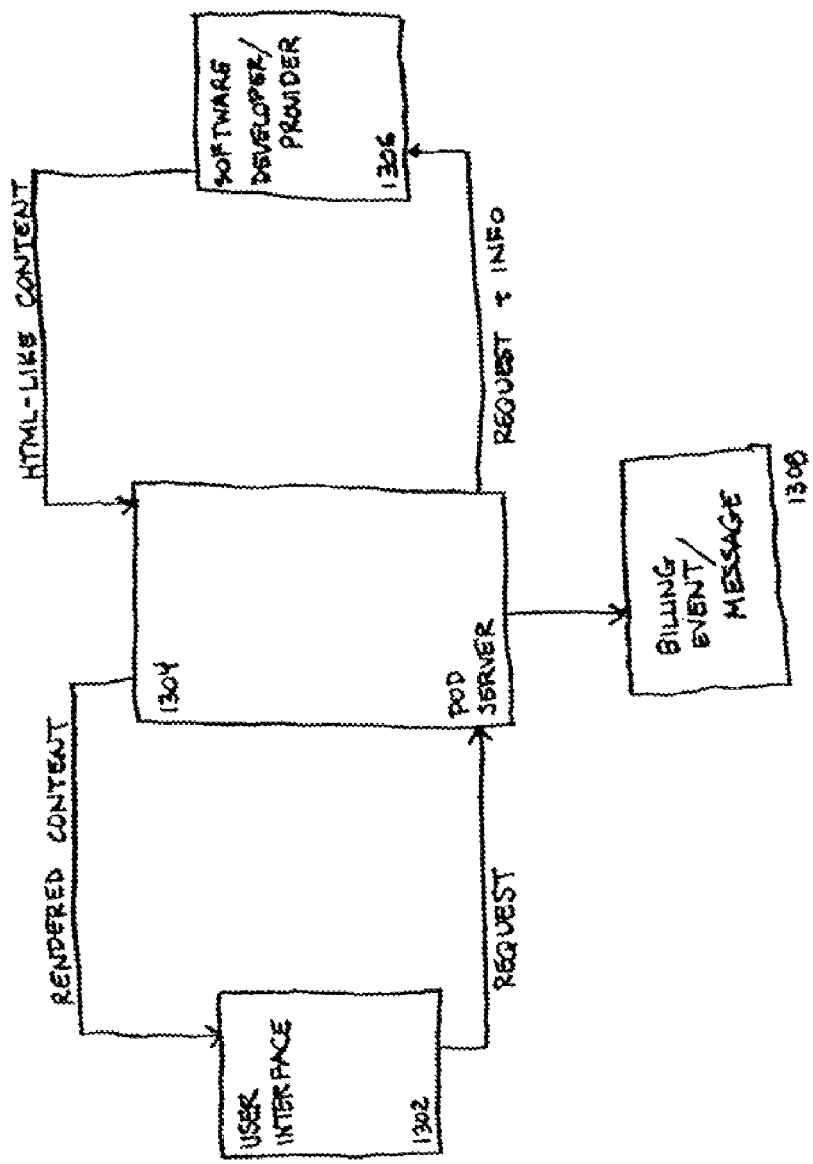

FIGS. 12 and 13 illustrate the operation of a pod and its associated pod application within the mobile community 202. As known to one of ordinary skill, the pod server 1304 may be a process executing on a separate, dedicated processor or may be included as part of the user area 304 or the global mobile platform 306. In step 1202, a user interacts with some feature on the pod user interface 1302 to generate a request. This request, includes the URL associated with the content of the pod and a query string (if any) based on the fields of the pod, and information input by the user. The query string is sometimes referred to as transient parameters.

In response to the request from the pod user interface, 1302, the pod server 1304 identifies the pod developer and the URL of the content and adds some additional information, in step 1204. The augmented request is sent to the software provider's application 1306 which responds, in step 1204, to the augmented request.

The information added to the augmented can request include demographic information about the owner and viewer of the pod. In this way, the software application 1306 can respond with a first type of content if the owner and viewer are the same or respond with different content if the owner and viewer are different. One way to accomplish this distinction is for the user area 304 to refer to users by a unique user ID number. Thus, users can be distinguished without revealing sensitive information to a software developer such as the mobile telephone number of a user. Also, the software application 1306 can use this demographic information to collect statistics about its users.

Other additional information that might be added would include details about the type of user interface the user has available. Because users may be using their mobile device, their display may not be as robust as a desktop interface. Thus, a software application 1306 can control content based on the current graphical and bandwidth capabilities of the user. For example, the additional information can indicate whether the user is operating in a web-based or mobile-based environment, e.g., a WAP, BREW, J2ME, etc., based environment.

In response to the augmented request, the software application 1306 responds with code, in step 1206, that is substantially HTML data. This code is generated according to the application logic of the pod application 1306. In other words, it is the content that is returned to the user who is viewing the pod. In certain embodiments of the present invention, the code of the response varies from conventional HTML in certain ways. For example, because this is a managed communication system, non-standard HTML tags can be used and supported. Thus, non-standard tags can be used that are specific to the pod environment that are not applicable to generic HTML pages. For example, a pod has a title area and a message area. Tags specifically for controlling these areas may be used to add functionality to the pod environment described herein. One of ordinary skill will recognize that a number of different specialized tags and capabilities can be offered without departing from the scope of the present invention.

An additional variation from HTML is that of using templates where information can be provided by the pod server 1304. For example, for privacy concerns, little identifying information is sent to the software application 1306. However, the pod server 1304 has access to this information because it communicates with the user information stored in the user area 304. Thus, the use of templates will allow software applications 1306 to take advantage of this information to personalize the pod experience. For example, the template may include a tag <! FirstName !>. When the pod server 1304 encounters this tag in the template, it knows that the software application 1306 intends for the pod server to insert the first name of the user. A more detailed list of exemplary template tags is provided in the previously mentioned incorporated document.

When the pod server 1304 receives the HTML-like reply from the software application 1306, the pod server manipulates the reply into a format useful for the pod environment. For example, certain HTML features such as, for example, javascript, iframe, frame, and script features, are removed from the reply in order to improve the security of the content. Secondly, the pod server 1304 can replace the personalizable parameters in the templates with the actual user information. And thirdly, the pod server 1304 can translate the content into other display formats, depending on the operating environment of the user (mobile or computer).

For example, if a software provider is well-skilled in providing WAP code as opposed to conventional HTML code, then that provider can control which code, or content, is generated based on the information it knows about the user's interface. However, if a software provider is not skilled with, or does not support, generating content in different formats, then the software application can request (as part of the code it sends back to the pod server 1304) that the pod server 1304 translate the code into a more appropriate format.

Another modification the pod server 1304 can make is that of manipulating the hyperlinks within the code sent by the software provider. Under normal behavior, such a hyperlink would result in opening another browser window and following the link. As is known to one skilled in this area, the original hyperlinks are adjusted by the pod server 1304 so that following of the links remains under the control of the pod server 1304 and the user interface remains within the focus of the pod instead of some other browser window.

Once the pod server 1304 completes its changes to the original code in step 1208, the server 1304 renders the code and content to the user's pod 1302, in step 1212.

In addition to the code that is received from the software application 1306, the pod server 1304 can also receive information from the software application 1306 about a billing event that should be triggered for the particular content that the user requested. For example, the user may have requested a stock quote that will cost $1.00. When the application 1306 generates the content of the reply, it also generates a message that the pod user should be charged $1.00 for this transaction. One of ordinary skill will appreciate that there is wide variety of protocols for the pod server 1304 and the software application 1306 to exchange information related to a billable transaction. During operation, therefore, the software developer's application 1306 merely adheres to the agreed upon protocols to inform the pod server 1304 that a billable transaction has occurred.

When the pod server 1304 determines that the code from the application 1306 includes an indication that billing should occur, the pod server 1304 generates a billing event 1308, in step 1210. This billing event 1308 is forwarded to the global mobile platform 306 so that billing may occur by using the cellular carrier's underlying billing systems. The pod server 1304 has access to the recipient information (i.e., the pod user) and the billing rate of the pod application 1306. Therefore, an appropriately formatted billing message is easily generated.

The global mobile platform 306 includes a message interface 1402 to handle billing events from a variety of sources. Although a different interface could be designed for each different source of billing events, it is more efficient to use a single Application Programming Interface (API).

Figure 14:
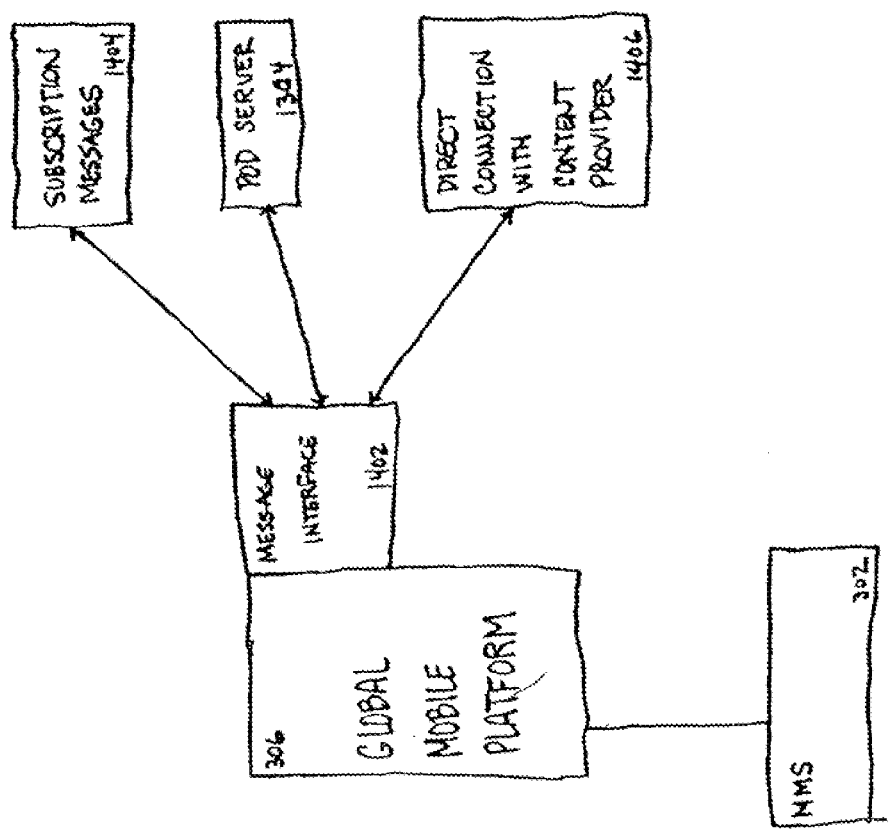
FIG. 14 is a block diagram of a global mobile platform that can be included in the computer-based global mobile community of FIG. 3.

One type of billing message originates from subscription-based services. Under these circumstances, a database or other storage system maintains a record of when to send a message to a user on a predetermined periodic basis (e.g., daily, monthly, weekly, etc.). When the management system for these subscription services indicate that a message is to be sent, then this message is forwarded to the interface 1402 (FIG. 14) of the global mobile platform 306 with the appropriate tariff information included.

As discussed earlier, the pod server 1304 can also generate a message based on a discrete billable event occurring due to the user's operation of a pod application. In this instance the billing message 1308 is forwarded to the interface 1402.

In another circumstance, the pod application may operate so as to avoid sending content back through the pod server 1304 but still be designed to perform a billable event. For example, the pod application may be a virtual greeting card application that sends text messages to people based on whether it is their birthday, anniversary, etc. and charges the pod user $0.25 for each card. Thus, the pod application 1306 performs billable activities but not via the content it sends back through the pod server 1304. Under these event-based circumstances, the software provider can establish a direct connection with the interface 1402 and send a billable message via the established API.

Regardless of how the billable event arrives at the interface 1402, the global mobile platform 306 processes it such that a message is sent via the MMS 302 through the cellular carriers to the user of the pod. This message, the content of which may say, for example, "Thank you for being a valued customer of xxx" will have associated with it a tariff code that results in the user being billed via their cellular service account.

Thus, a business model is established where the cellular carrier bills a user for various events and shares an agreed-upon portion of that billing with the mobile community platform who, in turn, shares an agreed-upon portion of that billing with the software provider. The carrier benefits from additional billable data traffic and the software provider benefits by obtaining instant access to all the users of the mobile community as well as instant access to the cellular carriers' billing systems in a seamless and unified fashion through the platform.

The presence of the global mobile platform 306 between the software provider's application 1306 and the MMS 302 provides the benefit that the messaging of different users of the mobile community 202 can be controlled to ensure the mobile community 202 is more enjoyable.

Within the mobile community, the various computer-based components discussed thus far have a vast amount of information stored and readily accessible. For example some of the information includes: identifying information about each pod application, identifying information about each user, identifying information about which pods are associated with each user, information about the terms and conditions regulating the operations of a pod application, and information about messages being sent via the mobile community 202. With this information available, one of ordinary skill will recognize that a number of operating parameters of the mobile community 202 can be monitored and controlled.

Figure 15:
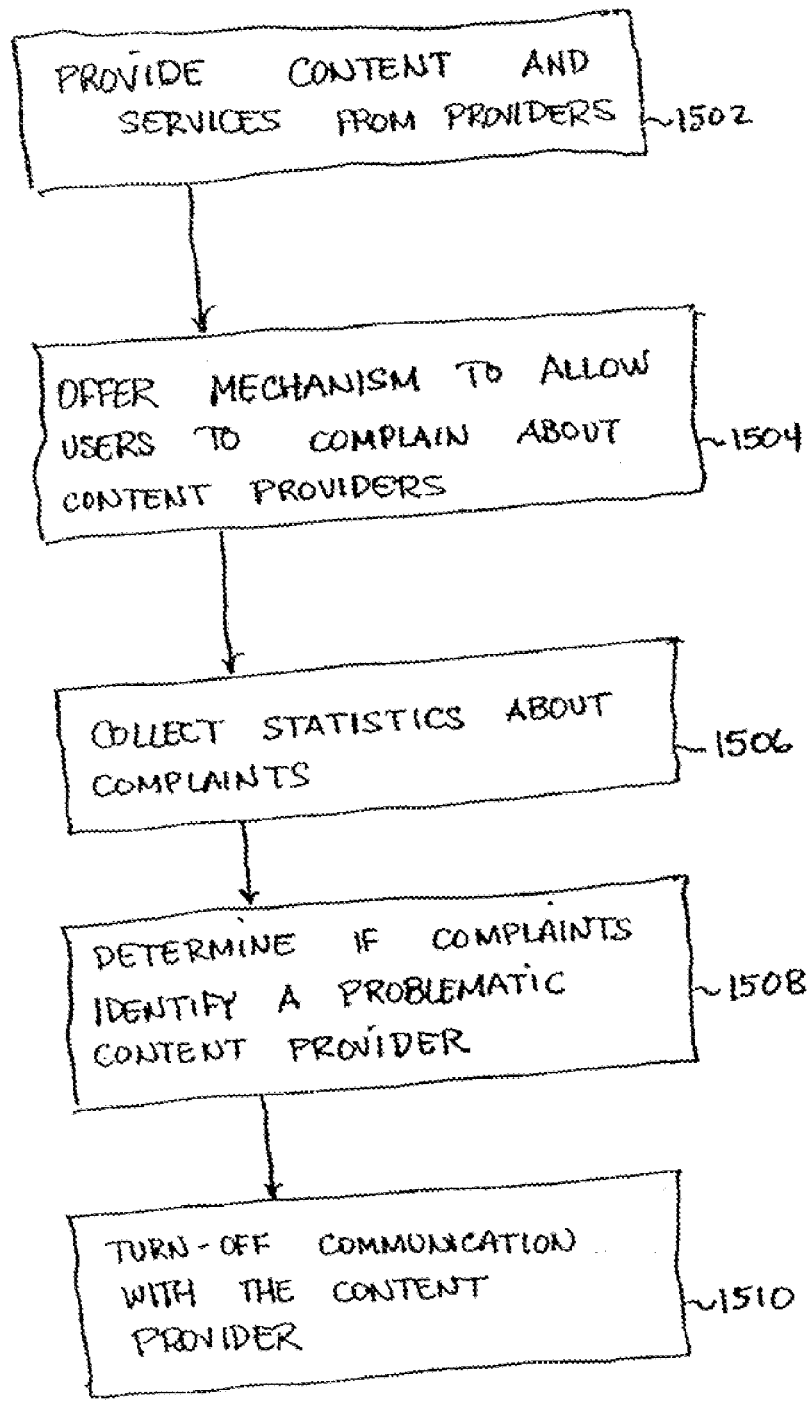
FIG. 15 is a flow chart illustrating an example method for instituting a complaint department within the mobile community of FIG. 2.

FIG. 15 depicts a flowchart of an exemplary method for instituting a complaint department within the mobile community 202, which can ultimately result in automatic cut-off of access to, and billing activities by, a software application. In accordance with this flowchart, while all the parties are using the mobile community 202, content and services are being provided by different software application providers in step 1502. Within the profile page of a user, or alternatively at a more centrally located page, a link may be provided, in step 1504, to submit a complaint. The global mobile platform 306 then collects these complaints and generates, in step 1506, statistics about them. For example, one statistic may be to identify what percentage of users of a pod application are complaining that it fails to operate as promised, provides unsuitable material, improperly bills, or includes some other problem.

In step 1508, the complaint statistics are evaluated to determine if a problem exists. Typically there would be checks and balances used to ensure that a single user is not abusing the system with a flood of complaints or that 100 complaints is not really a problem if the user base is 10 million. If a problem is found to exist with a particular pod application, then in step 1510, the global mobile platform turns-off communication with this pod application. Thus, the pod server can be informed to ignore any communications to or from that particular application. Because a software provider may supply more than one pod application, it is contemplated that the system could turn-off communication with all applications from that provider, not simply the ones relating to only the problematic application.

Figure 16:
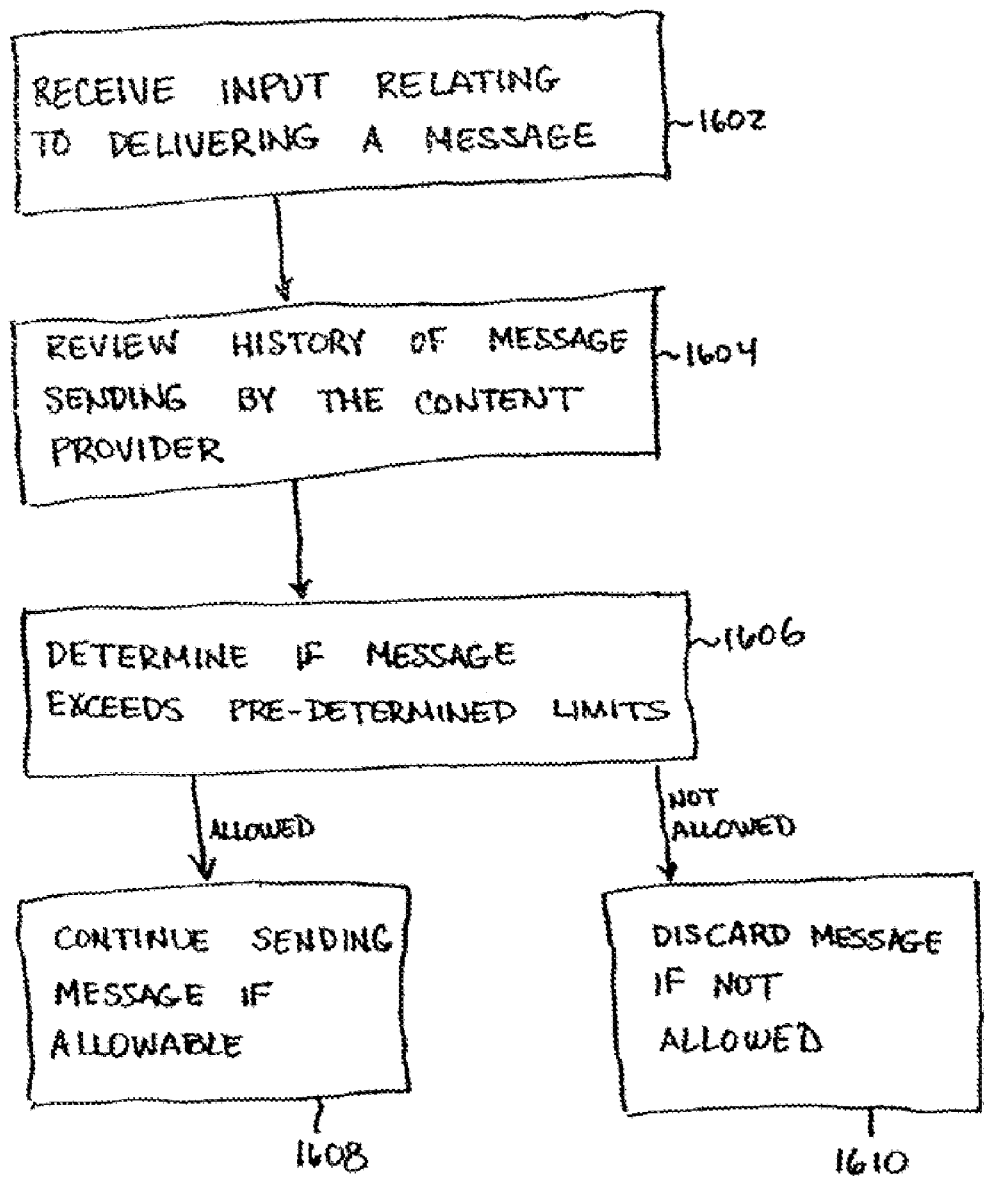
FIG. 16 is a flowchart illustrating an example method for regulating messages within the mobile community of FIG. 2.

FIG. 16 provides a flowchart of an exemplary method for regulating messages such that the agreed upon terms and conditions of the operating parameters of the pod application are adhered to. At the time a subscriber decides to subscribe to an application, the subscriber is shown details relating to price, message frequency, maximum messages in any given time period, and other terms relating to the specific application. Upon agreeing to those terms and conditions, those terms and conditions are memorialized for that specific subscriber within the online community, such that if the application provider later changes the price or other terms of the service, such new terms will only apply to the new subscribers that enter a "contract" after the date of change. The system ensures enforcement of the original terms and conditions that each individual subscriber was shown and agreed to.

In step 1602, the global mobile platform 304 receives via its interface 1402 a message to send to a user. As part of the agreed upon API, the message arrives from an identifiable source and specifies the recipients for the message. A recipient can be a single user or it could be a group such as "San Diego Padre fans," which the system will expand into the individual subscribers when delivering the message.

Thus, in step 1604, the global mobile platform analyzes historical information about messages sent by this sender to the specified recipient. In step 1606, this historical data can be compared to the pre-defined limits for the message sender. If the message would cause the pre-determined limits to be exceeded, then the message is discarded in step 1610 thereby avoiding billing of the user. If the message is allowable, then the message is sent as normal in step 1608.

In the above description of the various aspects of the present invention, the specific example of a software application provider was described in detail. This specific example was provided merely to highlight many of the features and aspects of the present invention but one of ordinary skill will recognize that providers of other types of products and services may also utilize and benefit from the mobile community system of FIG. 2. In particular, embodiments of the present invention allow vendors of all types of products and/or services to charge for their products via the mobile community's existing connectivity to the various carrier systems. In practice, a purchaser would consummate a transaction with a vendor for some product or service and, in the process, provide to the vendor a means of identifying that user within the mobile community. The vendor, in turn, will communicate with the mobile community (e.g., via the Mobile Global Platform) to initiate a billing event that identifies the purchaser and the transaction amount. As explained above, this billing event will result in the purchaser being billed via their wireless telephone subscriber account. In this way, the wireless telephone account (although this information is not necessarily revealed to the vendor) acts as a virtual wallet allowing the purchaser to easily pay for a variety of different types of transactions.

At least portions of the invention are intended to be implemented on or over a network such as the Internet. An example of such a network is described in FIG. 1. The description of the network and computer-based platforms that follows is exemplary. However, it should be clearly understood that the present invention may be practiced without the specific details described herein. Well known structures and devices are shown in block diagram form in order to avoid unnecessarily obscuring the present invention.

Figure 1:
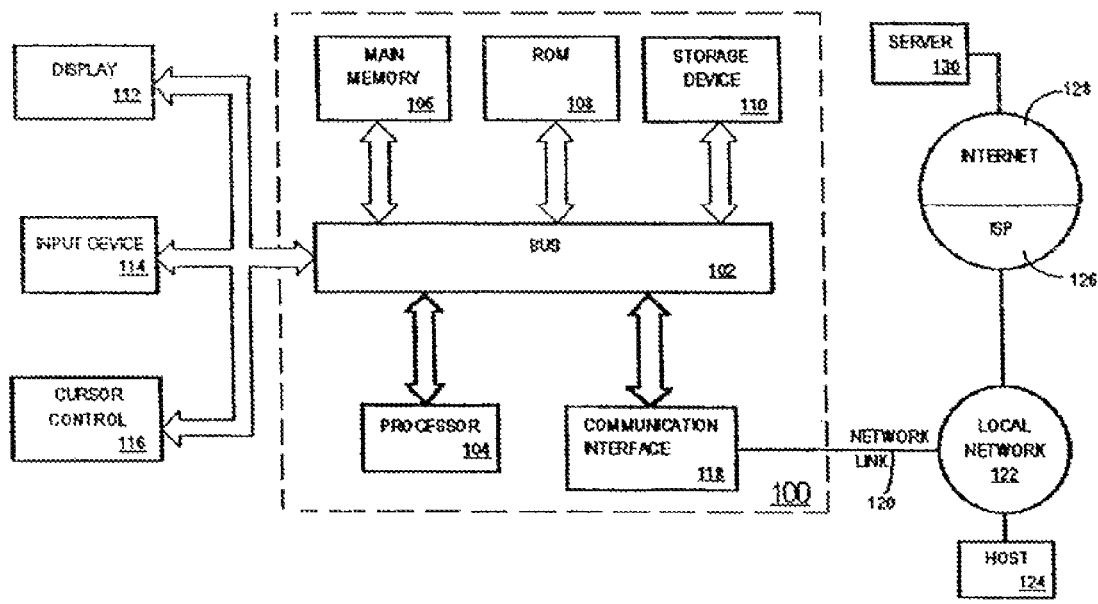
FIG. 1 is a block diagram that illustrates an exemplary computer system that can be configured to implement the systems and methods described herein.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

As mentioned, a developer can create and develop a pod application in a number of different ways using any of a variety of different development languages and environments. While different pod applications may accomplish many different purposes, there are certain functions that many pods will have in common. For example, sending an e-mail message or a text message to a recipient may be a common function shared among diverse pod applications. Also, building a query string for a database or forwarding a media file to a rendering engine are some functions that many different pod applications will likely include as well. Thus, the availability of libraries of re-usable code may advantageously be provided within one or more implementations of the system described herein. For example, referring to FIG. 3, a set of libraries 301 is provided to developers who log into the pod application development system. The developer may locate within the libraries of code 301 (in any one of many different languages) one or more previously developed functions or code-segments which pertain to a pod application the developer is designing. Once located, these code segments can then be downloaded by the developer and used, and re-used, in the development of pod applications. In one embodiment of the present invention, the developer libraries 301 may also allow developers to upload their own code to further widen the variety of available libraries for downloading by other developers. Appropriate security and code checking would likely be implemented to ensure unsafe or malicious code was not uploaded to the developer libraries 301.

In FIG. 3, the developer libraries 301 are shown as a logical block available through the Global Mobile Platform 306. This depiction is exemplary in nature and one of ordinary skill will recognize that the libraries 301 may be provided in a variety of different storage formats, computer platforms, and interconnected systems without departing from the scope of the present invention.

Using the developer's own resources as well as the available developer libraries 301, a developer can design various pods such as a pod to share music and/or alert users about the availability of new music. In addition to music, other media files such as video, text data, pictures and other digital content may be shared through developer-created application pods as well.

In other embodiments, the aforementioned platform provides support tools, functions and services to allow developers to easily develop application pods that are dynamic and community-based for access and use by mobile phone users to provide information, content and/or services to mobile phone users and billed on a micro-transaction level through the platform. The support tools, functions and services enable the application pods to provide the user with consistent community functions and to communicate data to and from the application pod in a dynamic fashion.

Figure 17:
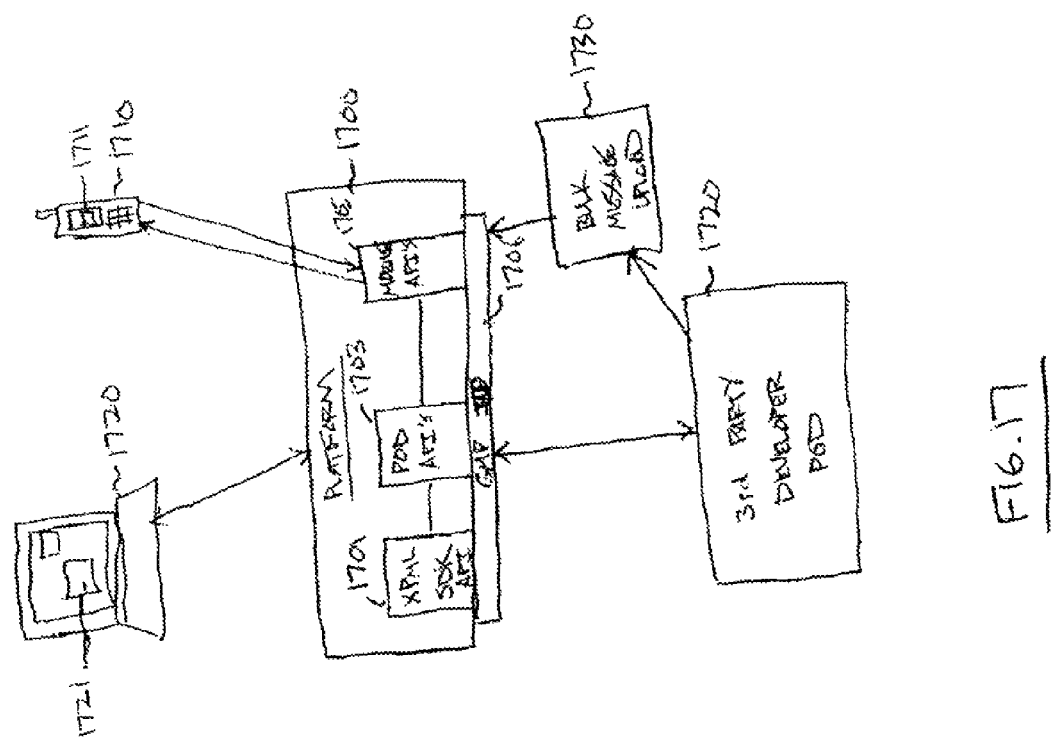
FIG. 17 is a block diagram illustrating another example embodiment of the global mobile platform of FIG. 3.

In this regard, FIG. 17 depicts an exemplary embodiment of the above-described community platform. As seen in FIG. 17, mobile community platform 1700 is provided which is described above as mobile community 202 of FIG. 2, and includes the components described above with respect to FIG. 3. In the embodiment shown in FIG. 17, mobile community platform 1700 includes several sets of APIs that are used by a third party developer to develop an application pod and also that are used by platform 1700 to provide community-based dynamic functionality to application pods thereby allowing users of such application pods to benefit from the community services and functions available through community platform 1700.

In particular, community platform 1700 is seen to include xPML software development kit (SDK) APIs 1701, Pod APIs 1703 and Mobile APIs 1705. In the example of FIG. 17, xPML SDK APIs 1701 and Pod APIs 1703 are preferably made available to third-party developers through global mobile platform 1706 (same as described of above with respect to FIG. 3) of community platform 1700. Mobile APIs 1705 are used by community platform 1700 to convert an application pod functionality for display and use of the application pod on a mobile device, such as a mobile phone 1710, instead of on a personal computer, such as computer 1721. In FIG. 17, third party application pod 1720 is developed by a third party incorporating some or all of the functional interface, functions and services provided by xPML SDK APIs 1701 and Pod APIs 1703, and offers the developed application pod 1720 through community platform 1700 to users of community platform 1700. Community platform 1700 then renders the pod 1721 in HTML according to the APIs implemented in application pod 1720 for access and use on computer 1720, or, if mobile phone 1710 is being used to access application pod, then it is rendered in a mobile protocol, such as WAP or other suitable protocol, for display 1711 on mobile phone 1710.

xPML SDK APIs 1701 are provided by platform 1700 to third party developers to implement into an application pod in order to take advantage of community services and functions offered by platform 1700. Among other functions and services, xPML SDK APIs 1701 provide function "tags" that a third-party developer can incorporate in an application pod to add community functionality and efficient communication to the application pod.

Figure 18:
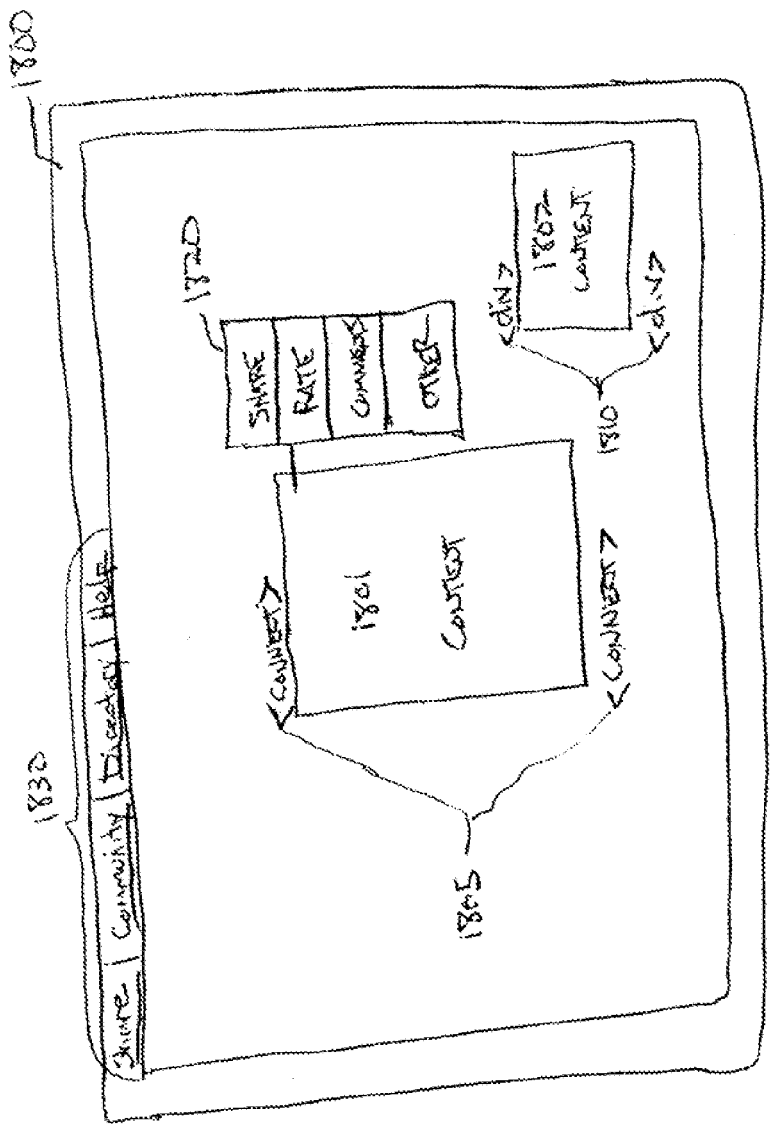
FIG. 18 is a diagram illustrating an example pod that includes content and content tags according to one embodiment.

FIG. 18 is a depiction of an application pod that was developed using tags provided by xPML SDK APIs 1701. As seen in FIG. 18, the use of certain tags within an application pod are graphically demonstrated for explanatory purposes. Application pod 1800 is shown in FIG. 18, in which the third-party developer has configured content area 1801 and content area 1802 within the frame of pod 1800 for displaying desired content. For example, content area 1801 may be a picture, and content area 1802 may be dynamic text that contains comments related to the picture in content area 1801. As further seen in FIG. 18, the third party developer has incorporated tags 1805 that bracket content area 1801, and also tags 1810 that bracket content area 1802. In this example, both of tags 1805 and tags 1810 are provided by xPML SDK APIs 1701.

Tags 1805 are <content> tags that allow a user of application pod 1800 to use community-based functions with respect to the content that is bracketed between <content> tags 1805. In this regard, when a user scrolls the mouse or pointing device over content area 1801, the content tags 1805 trigger the display of a pop-up side menu 1820 which contains several community-based menu functions. Menu 1820 allows a user of pod 1800 to share the content of content area 1801 with other users of the community platform, to rate the content of content area 1801 for other users of pod 1800 to see, to enter comments regarding the content of content area 1801 for other users of pod 1800 to see, or other community-based functions, such as receiving information about more application pods that are popular with other users of this pod, and such as obtaining help information related to this pod. In this manner, a third party developer can easily incorporate and take advantage of the community-based functionality and services supported by the community platform simply by incorporating the <content> tags provided by xPML SDK APIs 1701.

Also seen in FIG. 18, the tags 1810 that bracket content area 1802 are <div> tags. These <div> tags allow the content in content area 1802 in between the <div> tags to be refreshed without having to refresh the entire display of pod 1800. In this manner, only some displayed content on pod 1800 can be refreshed and updated, without needing the time, bandwidth and computing resources necessary to update the entire pod display. For example, the targeted content area may contain a static picture, and content area 1802 may contain a text display of the most recent comment related to the picture entered by all users of pod 1800. When a new comment is entered by one of the users of pod 1800, then only content area 1802 is updated to display the new content because of the use of the <div> tags around content area 1802. This is more efficient than having to re-render the entire display of pod 1800. This targeting method can be used with any other HTML element, not just <div> tags.

Of course, many other functions and services are supported by tags provided by xPML SDK APIs 1701. In addition to the <content> and <div> tags, tags provided by xPML SDK APIs 1701 also includes tags for incorporating predetermined menus into the pod, and for allowing a developer to set up a user dictionary related to the pod in order to request information about certain items subjects related to the pod.

Returning to FIG. 17, Pod APIs 1703 provide functions and services for the third party developer to incorporate into application pod 1800 to easily render the graphic interface of the frame (as opposed to the content window) of application pod 1800, and also to incorporate a standard set of menus into the pod frame, such as long the upper tool bar area of the pod frame. In this manner, the pods developed for use with platform 1700 will all have a consistent look and feel to them, and also will have a same basic set of standard menus for operation of the pod and for access and use of community services.

In this regard, when a third party developer develops an application pod that incorporates APIs from Pod APIs 1703, a pod frame will be rendered for display to a user of the pod in a predetermined fashion, and will also incorporate a standard set of functional menus in the upper toolbar of the pod frame. Pod 1800 of FIG. 18 demonstrates a pod frame that is rendered according to a predetermined API that the developer of pod 1800 simply incorporated into application pod 1800. In addition, the upper toolbar 1830 of pod 1800 was implemented by the third party developer of pod 1800 simply by incorporating an API from Pod APIs 1703. As seen in FIG. 18, upper toolbar 1830 includes functional menus for "Share," "Community," "Directory" and "Help." For example, the "Share" menu of upper toolbar 1830 allows the user of pod 1800 to send a message to other users recommending this application pod to them. The message can be sent by SMS, IM, email, or other means.

The "Community" menu of upper toolbar 1830 allows the user of pod 1800 to rate application pod 1800, such as by a range of 1 to 5 stars, or to comment on application pod 1800 for other users of application pod 1800 to view, or to access a blog related to application pod 1800. The "Directory" menu of upper toolbar 1830 displays a list of other application pods that are recommended by other users of this application pod, and the "Help" menu of upper toolbar 1830 allows the user to access help related to application pod 1800, such as by contacting the developer/operator of pod 1800 for assistance. In this manner, many different types of application pods can be provided to the community, while still maintaining a same look and feel, and basic community functionality among all of the application pods.

Returning back to FIG. 17, Mobile APIs 1705 is seen provided in platform 1700, and provides a set of interfaces to allow a application pod, and a user's home page, to be displayed on a mobile device, such as mobile phone 1710. In this regard, the community platform recognizes when a user is requesting to access an application pod from a computing device, such as computer 1720, or from a mobile device, such as mobile phone 1710. Platform 1700 then renders application pod 1720 appropriately, such as in HTML 1721, if the pod is being accessed from computer 1720, or in WAP by using Mobile APIs 1705, if the pod is being accessed from mobile phone 1710. The detection of the type of device accessing the application pod, and the appropriate rendering based on that detection, is discussed above with respect to FIG. 13.

Platform 1700 can also pass the detection of the type of device accessing the pod to application pod 1800, so that the developer can include logic to change the functionality of application pod depending on the type of device that is accessing the pod. Also as seen in FIG. 17, Mobile APIs 1705 supports two-way communication between platform 1700 and application pod 1711 on mobile phone 1710. In this manner, the user of an application pod on mobile phone 1710 can have two-way communication via the application pod, such as to receive and reply to messages from the developer/operator of the application pod. Also, the user of application pod 1800 can enter commands to application pod 1720 via mobile phone 1710 and then receive responses in application pod 1800 from platform 1700 or from the developer/operator of pod 1700. For example, if application pod 1800 is a stock price reporting service, then the user can enter a new requested stock name via mobile phone 1710, and a message is sent from mobile phone 1710 to platform 1700 and on to the developer/operator 1720 to obtain the requested stock price, which is then sent back to mobile phone 1720 via platform 1700. In this manner, application pods that incorporate the functionality of Mobile APIs 1705 provide dynamic communication and functionality to the user on a mobile device. The communication between mobile phone 1710, platform 1700 and the developer/operator can be in SMS, MMS, email or other communication means.

In this regard, Mobile APIs 1705 also provides the functionality for the third party developer/operator of an application pod to easily send communications to users of the application pod. In particular, the developer/operator can address messages to be sent to all users of the application pod, or to specific users as addresses by a user ID. In this manner, users of the application pod can receive new content through the application pod on a periodic basis, or can receive information messages from the developer/operator regarding the application pod. Mobile APIs 1705 also provides a developer/operator with the functionality to schedule a block of various messages to be sent to various users of the application pod for a predetermined duration of time.

For example, if the developer/operator can schedule all messages that need to be sent to all users, and to only some specified users, over the course of the next three months. This feature greatly assists the developer/operator in getting data and information sent to users of the application pod for a long period of time. This "bulk" scheduling of messages to users of application pod 1720 is shown in FIG. 17, in which the developer/operator uploads to platform 1700 a bulk schedule 1730 of many messages to be sent to various groups of users of application pod 1720. The messages in bulk schedule 1730 are then delivered by platform 1700 to users according to the appropriate date/time and appropriate user IDs to which each message is addressed.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A social networking site for supporting a network-enabled application, comprising:
   a plurality of communication channels to a respective plurality of wireless network carriers, each of the wireless network carriers having a plurality of users with cell phone service with the respective wireless network carrier;
   at least one processor;
   at least one interface having access to the internet;
   at least one Application Programming Interface (API); and
   at least one computer readable medium carrying one or more sequences of instructions for integrating the network-enabled application with the social networking site, wherein execution of the one or more sequences of instructions by the one or more processors causes the one or more processors to perform:
      a web page establishment step of establishing, on the social networking site, a user profile web page associated with each of the plurality of users;
      a application access step of making a plurality of network-enabled applications available, in the social networking site, to the plurality of users via an area on the social networking site and allowing each of the plurality of users the ability to place one of the plurality of network-enabled application on their web page and to access or use the network-enabled application on the web-page;
      a selection receipt step of receiving, in the social networking site, a selection indication from one of the plurality of users selecting a network-enabled application, the selection indication including an application identifier and network location information corresponding to the location of the network-enabled application on a third party application server;
      a recognizing step of recognizing, in the social networking site, the application identifier and the network location information and sending a request to the third party application server associated with the application identifier and the network location information;
      a receiving step of receiving, in the social networking site, code instructions associated with the selected network-enabled application from the third party application server in response to the request;
      a rendering step of rendering, in the social networking site, the selected network-enabled application in accordance with the code instructions and the API;
      a billing event detection step of detecting, in the social networking site, a billing event generated by the network-enabled application, the billing event containing an identification code corresponding to the user; and
      a billing message step of sending, in the case that the billing event is determined to be valid in the billing validation step, a billing message from the social networking site to an external billing mechanism, the billing message containing a billing amount which the external billing mechanism bills to the user as part of a bill for the user's cell phone service.

2. A platform according to claim 1, wherein the API is an API associated with a mobile user interface capability, and wherein rendering the selected network-enabled application in accordance with the API, comprises a recognizing step, performed in the platform, of recognizing a user interface type associated with the user, and rendering the network-enabled application appropriately based on the user interface type.

3. A platform according to claim 2, wherein recognizing the user interface comprises the step of recognizing, preformed in the platform, whether the user interface is a mobile user interface.

4. A platform according to claim 3, wherein rendering the network-enabled application appropriately comprises the step of rendering, performed in the platform, the network-enabled application in one format when the user interface is a mobile user interface and in another when the user interface is not a mobile user interface.

5. A platform according to claim 4, wherein the network application is rendered in mobile protocol if the user interface is a mobile user interface.

6. The platform according to claim 4, rendering the network-enabled application appropriately comprises the step of translating, performed in the platform, a format associated with the code instructions into an appropriate format for the user interface.

7. The platform according to claim 6, wherein the step of translating comprises the step of removing, performed in the platform, certain features from the code to improve security.

8. The platform according to claim 7, wherein the format associated with the code is an HTML format, and wherein the features removed comprise at least one of javascript, iframe, and script features.

9. The platform according to claim 7, wherein the features removed comprise hyperlinks.

10. A platform according to claim 3, wherein rendering the network-enabled application appropriately comprises the step of modifying, performed in the platform, the network-enabled application functionality when the user interface is a mobile user interface.

11. A platform according to claim 10, wherein modifying the network-enabled functionality comprises the step of adding, performed in the platform, two-way communication capability between the third party application server and the mobile user interface via the network-enabled application.

12. The platform according to claim 11, wherein the communication capability is via text messaging.

13. The platform according to claim 11, wherein the communication capability is via Short Message Service (SMS).

14. The platform according to claim 11, wherein the communication capability is via Mobile Message Service (MMS).

15. The platform according to claim 11, wherein the communication capability is via email.

16. A platform according to claim 10, wherein modifying the network-enabled functionality comprises the step of enabling, performed in the platform, the user to enter commands through the network-enabled application to be communicated to the platform via the user interface.

17. A platform according to claim 16, wherein execution of the one or more sequences of instructions by the one or more processors causes the one or more processors to perform:
the step of receiving, in the platform, a command from the user interface; and
the step of forwarding the command to the application server.

18. A platform according to claim 17, wherein execution of the one or more sequences of instructions by the one or more processors causes the one or more processors to perform:
the step of receiving, in the platform, a response from the application server, when the command is forwarded; and
the step of forwarding the response to the user via the user interface.

19. The platform according to claim 17, wherein the communication capability is via text messaging.

20. The platform according to claim 17, wherein the communication capability is via Short Message Service (SMS).

21. The platform according to claim 17, wherein the communication capability is via Mobile Message Service (MMS).

22. The platform according to claim 17, wherein the communication capability is via email.

23. A platform according to claim 1, wherein execution of the one or more sequences of instructions by the one or more processors causes the one or more processors to perform:
the step of receiving, in the platform, at least one message from the application server for deliver to at least one of the plurality of users; and
the step of communicating, in the platform, the message to the at least one of the plurality of users.

24. A platform according to claim 23, wherein the step of receiving further comprises receiving, in the platform, at least one message from the application server for delivery to at least one of the plurality of users at a specified time or periodic interval.

25. A platform according to claim 23, wherein the step of receiving further comprises receiving, in the platform, a bulk schedule for at least one message to be delivered to at least one of the plurality of users at certain specified times.

* * * * *